United States Patent
Hirani et al.

(10) Patent No.: US 12,350,991 B2
(45) Date of Patent: Jul. 8, 2025

(54) PLUG AND PLAY SUSPENSION

(71) Applicant: Fox Factory, Inc., Duluth, GA (US)

(72) Inventors: Asimm Hirani, Atlanta, GA (US); Robert Stanford, Alpharetta, GA (US); Nobuhiko Negishi, Santa Cruz, CA (US); Andrew Peterson, Braselton, GA (US); Rick Strickland, Scotts Valley, CA (US); James Alens, Gainesville, GA (US); Connor Randall, Scotts Valley, CA (US)

(73) Assignee: Fox Factory, Inc., Duluth, GA (US)

( * ) Notice: Subject to any disclaimer, the term of this patent is extended or adjusted under 35 U.S.C. 154(b) by 43 days.

(21) Appl. No.: 17/989,593

(22) Filed: Nov. 17, 2022

(65) Prior Publication Data

US 2023/0150333 A1  May 18, 2023

Related U.S. Application Data

(60) Provisional application No. 63/280,965, filed on Nov. 18, 2021.

(51) Int. Cl.
*B60G 17/08* (2006.01)
*B60G 17/015* (2006.01)
*B60G 17/018* (2006.01)

(52) U.S. Cl.
CPC ......... *B60G 17/08* (2013.01); *B60G 17/0152* (2013.01); *B60G 17/018* (2013.01); *B60G 2202/415* (2013.01); *B60G 2600/202* (2013.01); *B60G 2800/91* (2013.01)

(58) Field of Classification Search
CPC .. B60G 17/08; B60G 17/0152; B60G 17/018; B60G 2202/415; B60G 2600/202; B60G 2800/91; B60G 2500/10; B60G 2600/71; B60G 17/06
See application file for complete search history.

(56) References Cited

U.S. PATENT DOCUMENTS

| | | | |
|---|---|---|---|
| 7,484,603 B2 | 2/2009 | Fox | |
| 8,838,335 B2 | 9/2014 | Bass et al. | |
| 8,955,653 B2 | 2/2015 | Marking | |
| 9,303,712 B2 | 4/2016 | Cox | |
| 9,353,818 B2 | 5/2016 | Marking | |
| 9,682,604 B2 | 6/2017 | Cox et al. | |
| 9,797,467 B2 | 10/2017 | Wootten et al. | |

(Continued)

FOREIGN PATENT DOCUMENTS

| | | | | |
|---|---|---|---|---|
| DE | 202006017550 U1 | 3/2007 | | |
| DE | 102009027939 A1 | 8/2010 | | |
| EP | 4183604 A1 * | 5/2023 | ......... | B60G 17/0152 |

OTHER PUBLICATIONS

European Extended Search Report for EP Application No. 22208423. 8, 9 Pages, Mailed Mar. 3, 2023.

(Continued)

*Primary Examiner* — Jacob M Amick
*Assistant Examiner* — Charles J Brauch

(57) ABSTRACT

A plug and play suspension system is disclosed. The plug and play suspension system includes at least one electronically adjustable shock assembly, a controller, and a communications network to communicatively couple said controller with said at least one electronically adjustable shock assembly.

25 Claims, 7 Drawing Sheets

(56) References Cited

U.S. PATENT DOCUMENTS

| | | |
|---|---|---|
| 10,036,443 B2 | 7/2018 | Galasso et al. |
| 10,060,499 B2 | 8/2018 | Ericksen et al. |
| 10,415,662 B2 | 9/2019 | Marking |
| 10,443,671 B2 | 10/2019 | Marking |
| 10,737,546 B2 | 8/2020 | Tong |
| 10,933,710 B2 | 3/2021 | Tong |
| 11,459,050 B2 | 10/2022 | Allinger et al. |
| 2013/0328277 A1* | 12/2013 | Ryan ................ B60G 17/0165 280/5.519 |
| 2014/0238797 A1* | 8/2014 | Blankenship ............ F16F 9/36 188/313 |
| 2018/0339566 A1 | 11/2018 | Ericksen et al. |
| 2019/0100068 A1 | 4/2019 | Tong |
| 2021/0179227 A1 | 6/2021 | Sintorn et al. |
| 2021/0309064 A1 | 10/2021 | Negishi et al. |
| 2021/0331550 A1 | 10/2021 | Schoolcraft et al. |

OTHER PUBLICATIONS

European Examination Report for EP Application No. 22208423.8, 6 Pages, Mailed May 16, 2025.

\* cited by examiner

PLUG AND PLAY SUSPENSION

CROSS-REFERENCE TO RELATED APPLICATIONS (PROVISIONAL)

This application claims priority to and benefit of U.S. Provisional Patent Application No. 63/280,965 filed on Nov. 18, 2021, entitled "ON-SHOCK EMBEDDED ELECTRONICS" by Asimm Hirani et al., and assigned to the assignee of the present application, the disclosure of which is hereby incorporated by reference in its entirety.

FIELD OF THE INVENTION

Embodiments of the invention generally relate to a suspension.

BACKGROUND

Shock assemblies are used in numerous different vehicles and configurations to absorb some or all of a movement that is received at a first portion of a vehicle before it is transmitted to a second portion of the vehicle. For example, when a front tire of a vehicle hits a rough spot, the encounter will cause an impact force. However, by utilizing suspension components including one or more shock assemblies, the impact force can be significantly reduced or even absorbed completely before it is transmitted to a vehicle operator.

Conventional shock assemblies provide a constant damping rate during compression or extension through the entire length of the stroke. As various types of recreational and sporting vehicles continue to become more technologically advanced, what is needed in the art are improved techniques for varying the performance characteristics of the shock assemblies.

BRIEF DESCRIPTION OF THE DRAWINGS

Aspects of the present invention are illustrated by way of example, and not by way of limitation, in the accompanying drawings, wherein.

Figure 1A:
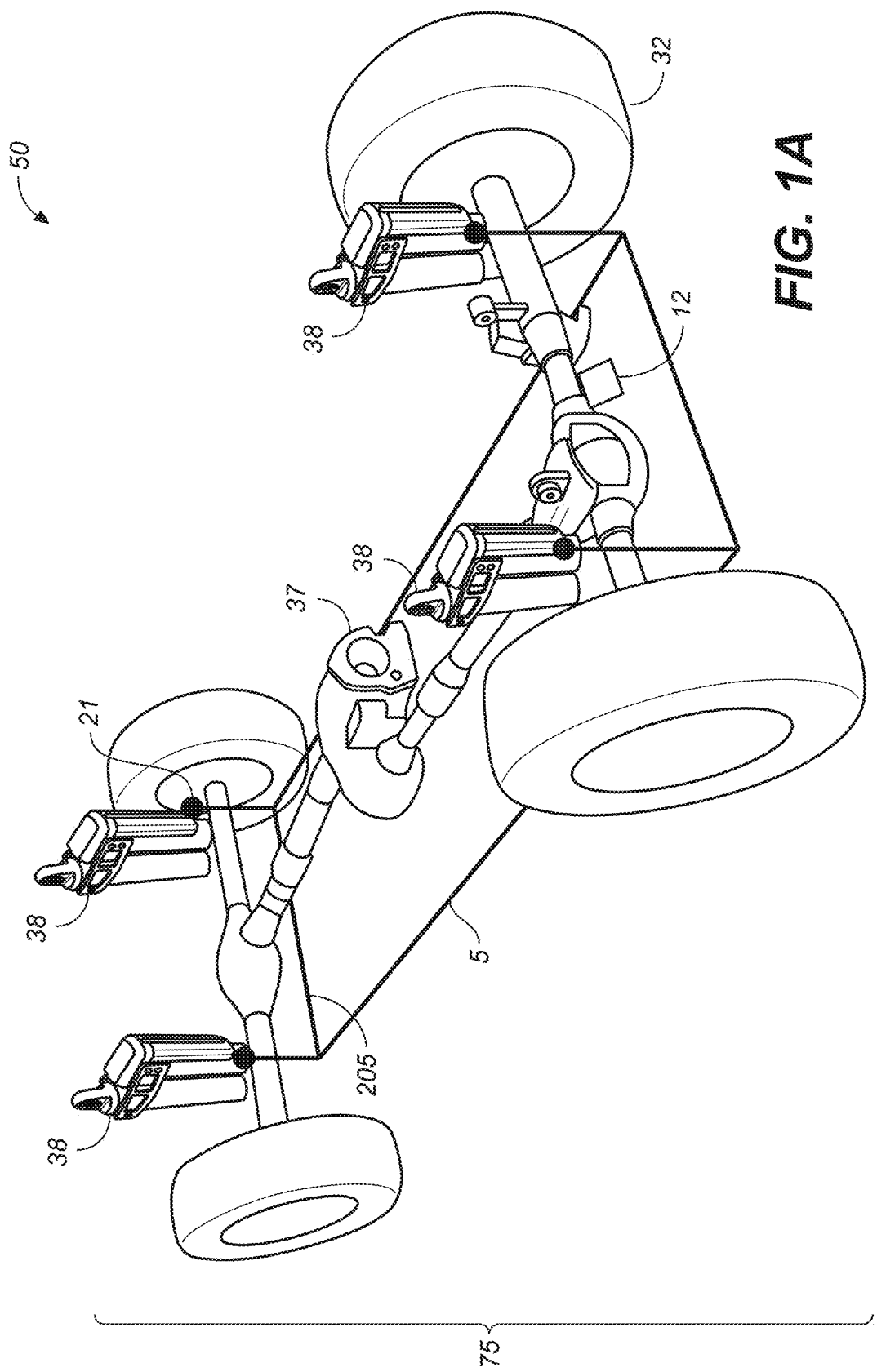
FIG. 1A is a perspective view of a vehicle with a plug and play suspension, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

Terminology

In the following discussion, a number of terms and directional language is utilized. Although the technology described herein is useful on a number of different suspension systems that use a shock assembly, a wheeled vehicle is used in the following description for purposes of clarity.

In general, a suspension system for a vehicle provides a motion modifiable connection between a portion of the vehicle that is in contact with a surface (e.g., an unsprung portion) and some or all of the rest of the vehicle that is not in contact with the surface (e.g., a suspended portion). For example, the unsprung portion of the vehicle that is in contact with the surface can include one or more wheel(s), skis, tracks, hulls, etc., while some or all of the rest of the vehicle that is not in contact with the surface include suspended portions such as a frame, a seat, handlebars, engines, cranks, etc.

The suspension system will include one or numerous components which are used to couple the unsprung portion of the vehicle (e.g., wheels, skids, wings, belt, etc.) with the suspended portion of the vehicle (e.g., seat, cockpit, passenger area, cargo area, etc.). Often, the suspension system will include one or more shock assemblies which are used to reduce feedback from the unsprung portion of the vehicle before that feedback is transferred to the suspended portion of the vehicle, as the vehicle traverses an environment. However, the language used by those of ordinary skill in the art to identify a shock assembly used by the suspension system can differ while referring to the same (or similar) types of components. For example, some of those of ordinary skill in the art will refer to the shock assembly as a shock absorber, while others of ordinary skill in the art will refer to the shock assembly as a damper (or damper assembly).

In its basic form, the suspension is used to increase ride comfort, performance, endurance, component longevity and the like. In general, the force of jarring events, rattles, vibrations, jostles, and the like which are encountered by the portion of the vehicle that is in contact with the surface are reduced or even removed as it transitions through the suspension before reaching suspended portions of the vehicle to include components such as seats, steering wheels/handlebars, pedals/foot pegs, fasteners, drive trains, engines, and the like.

For example, on a wheeled vehicle, a portion of the wheel (or tire) will be in contact with the surface being traversed (e.g., pavement, dirt, gravel, sand, mud, rocks, etc.) while a shock assembly and/or other suspension system components will be coupled between a wheel retaining assembly and the suspended portion of the vehicle (often a portion of the vehicle frame and associated systems, the seat, handlebars, pedals, controls, steering wheel, interior, etc.).

In a snow machine, a portion of the track and/or the skis that will be in contact with the surface being traversed (e.g., snow, ice, etc.) while a shock assembly and/or other suspension components will be coupled between a track retaining assembly (and similarly the skis retaining assembly) and the suspended portion of the vehicle (usually including the engine and associated systems, the seat, handlebars, etc.).

In a boat or PWC vehicle, a portion of the hull will be in contact with the surface of the water while a shock assembly and/or other suspension components will be coupled between the hull and the suspended portion(s) of the vehicle (such as the seat, the handlebars, a portion of the vehicle frame, and/or the like).

The term initial sag settings or "sag" refers to a predefined vehicle ride height and suspension geometry based on the initial compression of one or more shock assemblies of the suspension system for a given vehicle when it is within its normal load envelope configuration (e.g., with a rider/driver/user and any initial load weight). Once the sag is established for a vehicle, it will be the designated ride height of the vehicle, until and unless the sag is changed.

The initial sag for a vehicle is usually established by the manufacturer. The vehicle sag can then be modified and/or adjusted by an owner, a mechanic, or the like. For example, an owner can modify the sag to designate a new normal ride height based on a vehicle use purpose, load requirements that are different than the factory load configuration, an adjustment modification and/or replacement of one or more of the suspension components, a change in tire size, a performance adjustment, aesthetics, and the like.

In one embodiment, the initial manufacturer will use sag settings resulting in a pre-established vehicle ride height based on vehicle use, size, passenger capacity, load capacity, and the like. For example, a truck (side-by-side, car, bicycle, motorcycle, snowmobile, or the like) may have a pre-established sag based on an expected load (e.g., a number of passengers, an expected cargo requirement, etc.).

Regardless of the vehicle type, once the sag is established, in a static situation the ride height of the expectedly loaded vehicle should be at or about the established sag. When in motion, the ride height will change as the vehicle travels over the surface, and while the suspension system is used to reduce the transference of any input forces received from the surface to the rest of the vehicle it is also used to maintain the vehicle's sag. Additional information regarding sag and sag setup can be found in U.S. Pat. No. 8,838,335 which is incorporated by reference herein, in its entirety.

As vehicle utilization scenarios change, one or more system on a shock assemblies of the plug and play suspension system can be adjusted for different characteristics based on the use type of the vehicle, terrain, purpose (e.g., rock crawl, normal use, race set-up, hill climb, etc.), and the like. This modification would result in a modified personal sag setting. For example, a downhill mountain bike rider (motocross rider, off-road truck driver, side-by-side rider, snow machine racer, etc.) would want a suspension configuration with a large range of motion and aggressive rebound and compression speeds to maintain as much contact as possible between the tires and the ground by absorbing the terrain events such as bumps, ruts, roots, rocks, dips, etc. while reducing the impacts felt at the suspended portion and also have the suspension return to its personal sag setting as quickly as possible in preparation for the next encounter.

In contrast, a flat (or smooth terrain) rider would want a firmer suspension configuration with a very small range of motion to provide feel for the grip of the tire, maintain friction and/or aerodynamic geometries, and the like, in order to obtain the maximum performance from the vehicle.

In one embodiment, there may be times where changes to a suspension component are desired during a given ride/drive. For example, a bike rider in a sprinting scenario would often want to firm up or possibly even lockout the suspension component to remove the opportunity for rider induced pedal bob. Similarly, a user of a snowmobile (or other rear-suspended vehicle) would often want to firm up and even lockout the suspension component coupled with the rear track to traverse deep snow (or sand, gravel, etc.), to main the connection between the terrain and the tread (or other drive component).

With respect to the term lockout, for purposes of the following discussion, lockout refers to the most restricted flow state attainable or desirable. Thus, in one embodiment, lockout refers to a stoppage of all fluid flow through a given flow path. However, in another embodiment, lockout does not stop all the fluid flow through a given flow path. For example, a manufactured component may not be able to stop all fluid flow due to tolerances, or a manufacturer (designer, etc.) may not want to stop all fluid flow for reasons such as lubrication, cooling, etc. Similarly, a lockout state could be a "perceived lockout"; that is, the flow area through a flow path of the adjustable shock assembly has been reduced to a minimum size for a given adjustable shock assembly, machine, environment, speed, performance requirement, etc. For example, in one "perceived lockout" most, but not all, of the fluid flow is minimized while in another "perceived lockout" the fluid flow is reduced by only half (or a third, quarter, three-quarters, or the like).

The term "active", as used when referring to a valve or shock assembly component, means adjustable, manipulatable, etc., during typical operation of the valve. For example, an active valve can have its operation changed to thereby alter a corresponding shock assembly characteristic damping from a "soft" setting to a "firm" setting (or a stiffness setting somewhere therebetween) by, for example, adjusting a switch in a passenger compartment of a vehicle. Additionally, it will be understood that in some embodiments, an active valve may also be configured to automatically adjust its operation, and corresponding shock assembly damping characteristics, based upon, for example, operational information pertaining to the vehicle and/or the suspension with which the valve is used.

Similarly, it will be understood that in some embodiments, an active valve may be configured to automatically adjust its operation, and corresponding shock assembly damping characteristics, based upon received user input settings (e.g., a user-selected "comfort" setting, a user-selected "sport" setting, and the like). In many instances, an "active" valve is adjusted or manipulated electronically (e.g., using a powered solenoid, electric motor, poppet, or the like) to alter the operation or characteristics of a valve and/or other component. As a result, in the field of suspension components and valves, the terms "active", "electronic", "electronically controlled", and the like, are often used interchangeably.

The term "manual" as used when referring to a valve or shock assembly component means manually adjustable, physically manipulatable, etc., without requiring disassembly of the valve, damping component, or shock assembly which includes the valve or damping component. In some instances, the manual adjustment or physical manipulation of the valve, damping component, or shock assembly which includes the valve or damping component, occurs when the valve is in use. For example, a manual valve may be adjusted to change its operation to alter a corresponding shock assembly damping characteristic from a "soft" setting to a "firm" setting (or a stiffness setting somewhere therebetween) by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension"). In a conventional "pure active suspension", a motive source such as, for example, an actuator, is used to move (e.g. raise or lower) a wheel with respect to the vehicle. In a "semi-active suspension", no motive force/actuator is employed to adjust move (e.g. raise or lower) a wheel with respect to the vehicle.

Rather, in a "semi-active suspension", the characteristics of the suspension (e.g. the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust move (e.g. raise or lower) a wheel with respect to the vehicle. As such, it will be understood that an "active valve", as defined above, is well suited for use in a "pure active suspension" or a "semi-active suspension".

In the following discussion, an electronically adjustable component of the system on a shock assembly may be active and/or semi-active. In general, the electronically adjustable component will have one or more electronically adjustable features controlled by a motive component such as a solenoid, stepper motor, electric motor, or the like. In operation, the electronically adjustable component will receive an input command which will cause the motive component to move, modify, or otherwise change one or more aspects of one or more electronically adjustable features.

One example of an electronically adjustable feature is a dual speed compression (DSC) base valve in a shock assembly. In general, the DSC provides compression adjustability that includes a low-speed compression (LSC) adjuster (or adjustment capability) and a high-speed compression (HSC) adjuster (or adjustment capability).

LSC primarily affects the compression damping during slow suspension movements such as G-outs, smooth jump landings, and the like. It also affects ride comfort of the vehicle. While the LSC settings can be dependent upon use conditions, rider preference, performance requirements, etc., general tuning parameters usually mean an LSC setting that provides good body control for anti-roll in corners, without causing excessive harshness or loss of front end traction.

HSC primarily affects the compression damping during medium-to-fast suspension movements such as steep jump faces, harsh flat landings, aggressive whoops, and the like. While the HSC settings can be dependent upon use conditions, rider preference, performance requirements, etc., general tuning parameters usually mean using as little HSC damping as possible without allowing bottom-out to occur.

In one embodiment, an electronically adjustable system on a shock assembly will include a manual command lockout capability. In one embodiment, the manual command lockout capability is a rotary spool type base valve. In one embodiment, the manual command lockout capability is a check shim type base valve architecture. In one embodiment, the manual command lockout base valve is a stand-alone valve. In one embodiment, the manual command lockout control feature is added to a user interface.

In one embodiment, the system on a shock assembly can include active valves such as compression valves, rebound valves, DSC base valves, and the like. Embodiments of different active valve suspension and components that may be utilized within the system on a shock assembly are disclosed in U.S. Pat. Nos. 8,838,335; 9,353,818; 9,682,604; 9,797,467; 10,036,443; 10,415,662; the content of which are incorporated by reference herein, in their entirety.

Operation

Referring now to FIG. 1A, a perspective view of a vehicle 50 with a plug and play suspension system 75 having at least one system on a shock assembly 38 is shown in accordance with an embodiment. Although a wheeled vehicle 50 is used in the discussion, the plug and play suspension system 75 having at least one system on a shock assembly 38 disclosed herein is also suited for use in other vehicles such as, but not limited to a bicycle, an electric bike (e-bike), a hybrid bike, a scooter, a motorcycle, an ATV, a personal water craft (PWC), a vehicle with three or more wheels (e.g., a UTV such as a side-by-side, a car, truck, etc.), an aircraft, and the like. In one embodiment, the plug and play suspension system 75 having at least one system on a shock assembly 38 is also suited for use in suspension inclusive devices such as, but not limited to, an exoskeleton, a seat frame, a prosthetic, a suspended floor, and the like. However, in the following discussion, and for purposes of clarity, a 4-wheeled vehicle 50 is utilized as the example vehicle upon which the plug and play suspension having at least one system on a shock assembly 38 is shown and described.

In one embodiment, vehicle 50 is a generic vehicle such as a car, truck, side-by-side, or the like driven by an engine and consisting of an unsprung portion (such as tires 32, drive train 37, axles, etc.), a sprung portion (such as a cockpit, seating area, etc.), and a plug and play suspension system 75 includes at least one system on a shock assembly 38 to couple the sprung portion of the vehicle with the unsprung portion.

In one embodiment, vehicle 50 can include one or more electronically actuated components, interactive components, and/or control features such as for example, a user interface 205, active and/or semi-active system on a shock assemblies 38, vehicle dynamic module (VDM) 21, one or more devices 12 (such as sensor or the like), a power source, smart components, and the like.

In general, the one or more sensor(s) could be used to monitor and/or measure things such as temperature, voltage, current, resistance, noise (such as when a motor is actuated, fluid flow through a flow path, engine knocks, pings, etc.), positions of one or more components of vehicle 50 (e.g., shock positions, ride height, pitch, yaw, roll, etc.), and the like. In one embodiment, the one or more sensor(s) could be forward looking terrain, vibrations, bump, impact event, angular measurements, and the like.

Additional information for vehicle suspension systems, sensors, and their components as well as adjustment, modification, and/or replacement aspects including manually, semi-actively, semi-actively, and/or actively controlled aspects and wired or wireless control thereof is provided in U.S. Pat. Nos. 8,838,335; 9,353,818; 9,682,604; 9,797,467; 10,036,443; 10,415,662; the content of which are incorporated by reference herein, in their entirety.

Figure 1B:
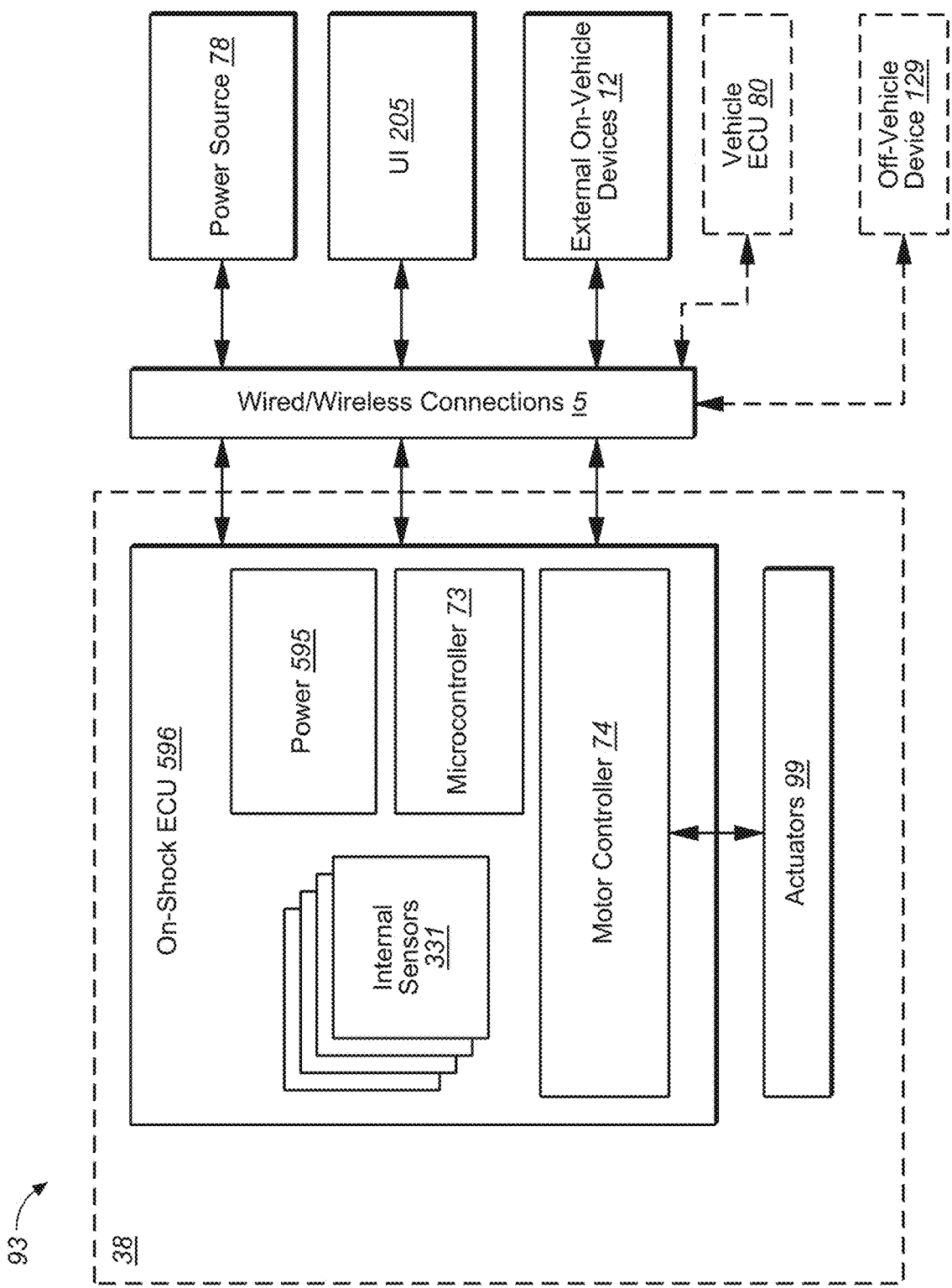
FIG. 1B is a schematic diagram of the plug and play suspension, in accordance with an embodiment.

Referring now to FIG. 1B, a schematic diagram of a plug and play suspension system 75 is shown in accordance with an embodiment. In one embodiment, plug and play suspension system 75 includes one or more electronically actuated components, interactive components, and/or control features. For example, in one embodiment, plug and play suspension system 75 includes at least one system on a shock assembly 38, and a communications network 5. In one embodiment, plug and play suspension system 75 also optionally utilizes a power source 78, and optionally communicates with none, one, some or all of a user interface 205 (or controller), external on-vehicle devices 12 (such as sensor or the like), the vehicle ECU 80, and one or more off-vehicle devices 129.

In one embodiment, an off-vehicle device 129 could be, for example, a trailer being towed. In one embodiment, system on a shock assemblies (and/or other interactive components) of the trailer can be added to the communications network 5. Further, if there was a vehicle, e.g., a side-by-side loaded on the trailer, the communications network 5 could expand to the tow vehicle, the trailer, and the side-by-side such that the system on a shock assemblies (and/or other interactive components) on each of the vehicles would be able to work in conjunction. For example, the tow vehicle hits bump, the information is passed to the trailer suspension which would be prepped for the event impact, and the information is also passed to the side-by-side, such that the side-by-side's suspension is adjusted to provide better interaction between the side-by-side and the trailer as the impact event is encountered by the trailer.

In another embodiment, an off-vehicle device 129 could be, for example, components of a second plug and play suspension system (such as located on another vehicle, a suspension inclusive devices such as, but not limited to, an exoskeleton, a seat frame, a prosthetic, a suspended floor, and the like). In one embodiment, components of the second plug and play suspension system can be added to the communications network 5 such that the plug and play suspension systems would be able to work in conjunction. For example, if the first plug and play suspension system encounters an event such as a dip ahead of the second plug and play suspension system. The event information is passed to the second trailing plug and play suspension system which would be able to prepare one or more components of the plug and play suspension system for the event encounter.

In one embodiment, plug and play suspension system 75 can include suspension components such as sway bars, and the like. For example, in one embodiment, one or a plurality of other component(s) of vehicle 50 are also smart component(s). In one embodiment, the smart component(s) will include connective features that allow them to communicate wired or wirelessly with one or more of the electronically actuated components, interactive components, control features, and/or the like of plug and play suspension system 75.

In one embodiment, data (including real-time data) is collected or provided from the smart component(s), electronically actuated components, interactive components, control features, and/or the like to one or more components of the plug and play suspension system 75. Depending upon the connected component, the data may be location data, sensor data, telemetry data, and the like. In general, telemetry data can include data such as angle, orientation, velocity, acceleration, RPM, operating temperature, and the like.

In one embodiment, plug and play suspension system 75 can include all of the components shown in the schematic diagram of FIG. 1B. In one embodiment, by eliminating harnesses and external components, cost and complexity of the plug and play suspension system 75 is reduced while durability is improved, as compared to existing suspension systems.

In one embodiment, plug and play suspension system 75 would include some of the components shown in the schematic diagram of FIG. 1B. For example, a partial plug and play suspension system 75 might include at least one system on a shock assembly 38 (although all of the shock assemblies on the vehicle 50 might not be system on a shock assemblies 38, some might be standard shock assemblies, active shock assemblies, a combination thereof, or the like), communications network 5, and optionally user interface 205.

In one embodiment, plug and play suspension system 75 will only include a limited number of the shown in the schematic diagram of FIG. 1B. For example, a plug and play suspension system 75 might only include one or more system on a shock assemblies 38.

In one embodiment, communication network 5 is a standalone communications network. That is, instead of utilizing existing vehicle wiring harness or communications systems, the communication network 5 will be specifically designed for use with the plug and play suspension system 75. Thus, in one embodiment, the installation of plug and play suspension system 75 will not require any taping into existing vehicle wiring. In one embodiment, communication network 5 may provide communication with one or some components of the vehicle such as an IVI, external on vehicle devices 12, the vehicle ECU 80, off-vehicle device 129, or the like.

In other words, in one embodiment, the components of plug and play suspension system 75 are not required to be added to or connected with, the main vehicle wiring harness. In one embodiment, the components of plug and play suspension system 75 do not require connectivity with the vehicle can bus (or ECU 80) to connect, access, control, monitor, adjust, modify, receive feedback, communicate or otherwise operate within the parameters of the vehicle 50 upon which they are installed. Instead, in one embodiment, the components of plug and play suspension system 75 are added to the vehicle and use their own communications network 5 to act as separately controlled items to monitor/adjust/modify or otherwise control the performance characteristics thereof.

In one embodiment, the plug and play suspension system 75 provides a plug and play capability such that one or more component are removed, replaced, added, or the like, to the plug and play suspension system 75 by adding the component to (or removing the component from) the vehicle 50 and then providing the component with access to (or removing the component's access from) the communication network 5.

In one embodiment, when a component is added to the plug and play suspension system 75 such that it has access to some, part, or all of the communications network 5, the component may be assigned its function and/or roll in the suspension system by one or more other components of plug and play suspension system 75.

In one embodiment, when a component is added to the plug and play suspension system 75 such that it has access to some, part, or all of the communications network 5, the component may automatically recognize or determine its function and/or roll in the suspension system. In one embodiment, when an added component automatically recognizes or determines its function and/or roll in the suspension system, the added component will use communications network 5 to broadcast that information to one or more other components of plug and play suspension system 75 (and/or other components, systems, or the like in communication with plug and play suspension system 75).

In one embodiment, components of plug and play suspension system 75 are added wired/wirelessly or a combination thereof as a none-to-node communications network 5. In one embodiment, they are added wired/wirelessly or a combination thereof as a spoke communications network 5. In one embodiment, they are added wired/wirelessly or a combination thereof as a hybrid communications network 5 that would include both node-to-node communications network 5 and spoke communications network 5 configurations.

In one embodiment, the systems on a shock assembly 38 may communicate with a vehicle ECU 80 via the vehicle can bus (or user interface 205, or the like) to provide sensor and/or performance information that can be used by the vehicle ECU 80 for vehicle performance information such as antilock braking, sway information, drift information, wheel spin information, ride height information, and/or data from other on-vehicle device(s) 12 that may be utilized by the vehicle ECU 80.

In one embodiment, communication network 5 is a wired communication network 5 (such as via a wiring harness or the like).

In one embodiment, power for one or more of the components of plug and play suspension system 75 is received over a wired connection. For example, the motive component such as a solenoid, stepper motor, electric motor, or the like that operates the valving in one or more system on a shock assemblies 38 would receive its power from a power source 78 coupled with the wiring harness (e.g., the vehicle battery, alternator, a power supply incorporated with user interface 205, a power supply coupled with another of the one or more system on a shock assemblies 38, a reserve or extra power supply for auxiliary components, or the like).

Although shown in certain locations in FIGS. 1A and 1, in one embodiment, one, some, or all of the components shown in FIGS. 1A and/or 1B could be located in other locations. For example, one, some, or all of the components could be located on the sides of components, at the handlebars, at a foot peg (or footwell), carried by the rider if it is wireless, located on a mount attached to a portion of the vehicle 50, etc. Thus, the use of the locations of components as shown in FIGS. 1A and 1B are indicative of one embodiment, which is provided for purposes of clarity.

In one embodiment, communication network 5 is a wireless communication network. For example, in one embodiment, one or more system on a shock assemblies 38 will be in wireless communication with one or more other system on a shock assemblies 38, the user interface 205 (and/or VDM 21, vehicle devices 12 (such as sensor or the like), or other components such as, but not limited to, those shown in FIG. 1B) without requiring a wiring harness.

In one embodiment, one or more system on a shock assemblies 38 will include its own power source 595 and the actuator(s) (e.g., motive component such as a solenoid, stepper motor, electric motor, or the like) that operates the active valve would receive its operating power therefrom. In other words, one or more of the system on a shock assemblies 38 would be a self-contained unit which would be able to perform an adjustment to at least one performance characteristic of the system on a shock assembly 38. In one embodiment, the adjustment may be generated by the on-shock ECU 596 as described herein. In one embodiment, the adjustment may be received vie the communications network 5 from another component such as user interface 205, an off-vehicle device 129, or the like.

In one embodiment, communication network 5 is a combination of wired and wireless connectivity.

In one embodiment, communication network 5 is a hub-spoke communications network. For example, in a spoke-type communications network 5 configuration, one or more of the components of plug and play suspension system 75 would communicate with a main control component such as VDM 21, user interface 205, or the like. The main control component would then be used to manage the components and performance of plug and play suspension system 75.

In one embodiment, for example, in a spoke-type communications network 5 configuration with no main control component, one of the systems on a shock assemblies 38 would be designated as the hub component. In one embodiment, the designated systems on a shock assembly 38 hub component would then be used to manage the components and performance of plug and play suspension system 75.

In one embodiment, communication network 5 is a node-to-node communications network. For example, in a node-to-node communications network 5 configuration, each of the systems on a shock assemblies 38 would communicate wired/wirelessly with each other and optionally with a main control component. In one embodiment, one, some, or all of the systems on a shock assemblies 38 and the optional main control component would be communicatively coupled (wired and/or wirelessly) with the user interface 205 (such as IVI, infotainment, mobile devices and applications), other peripheral devices, and optionally the vehicle ECU 80, off-vehicle device 129, or the like.

In one embodiment, for example, in a node-to-node communications network 5 configuration with no main control component, each of the system on a shock assemblies 38 would communicate wired/wirelessly with each other. In one embodiment, one, some, or all of the system on a shock assemblies 38 would also be communicatively coupled (wired and/or wirelessly) with the user interface 205 (such as IVI, infotainment, mobile devices and applications), other peripheral devices, and optionally the vehicle ECU 80, off-vehicle device 129, or the like.

In one embodiment, communication network 5 is a hybrid communications network of wired and wireless connectivity. For example, in a hybrid communications network 5 configuration, each of the components of plug and play suspension system 75 would communicate wired/wirelessly with each other and with a main control component. In one embodiment, the main control component would be communicatively coupled (wired and/or wirelessly) with the user interface 205 (such as IVI, infotainment, mobile devices and applications), other peripheral devices, and optionally the vehicle ECU 80, off-vehicle device 129, or the like.

In one embodiment of a hybrid communications network 5 configuration, each of the components of plug and play suspension system 75 would communicate wired/wirelessly with each other and with a main control component. In one embodiment, one, some, or all of the systems on a shock assembly 38 and/or the main control component would be communicatively coupled (wired and/or wirelessly) with the user interface 205 (such as IVI, infotainment, mobile devices and applications), other peripheral devices, and optionally the vehicle ECU 80, off-vehicle device 129, or the like.

In one embodiment, of a hybrid communications network 5 configuration with no main control component, each of the components of plug and play suspension system 75 would communicate wired/wirelessly with each other. In one embodiment, one, some, or all of the systems on a shock assembly 38 would also be communicatively coupled (wired and/or wirelessly) with the user interface 205 (such as IVI, infotainment, mobile devices and applications), other peripheral devices, and optionally the vehicle ECU 80, off-vehicle device 129, or the like.

For example, in one embodiment of a hybrid communications network 5, one or more system on a shock assemblies 38 would be in wireless communication with user interface 205 (such as IVI, infotainment, mobile devices and applications), other peripheral devices, and optionally the vehicle ECU 80, off-vehicle device 129, or the like, and any shock assembly adjustment inputs received at the one or more system on a shock assemblies 38 (e.g., the changing of the rebound tunes, compression tunes, lockout, or the like) would be received wirelessly. However, the actuators 99 (or other motive component such as a solenoid, stepper motor, electric motor, or the like) of the system on a shock assembly 38 would receive power from power source 78 via a wired connection with the vehicle battery, a power supply incorporated with user interface 205, a power supply coupled with any of the other system on a shock assemblies 38, a reserve or extra power supply for auxiliary components, or the like.

In another embodiment, the system on a shock assembly 38 would include its own power source (such as power source 595 shown in FIG. 3) and the actuators 99 (or other motive component such as a solenoid, stepper motor, electric motor, or the like) of the system on a shock assembly 38 would receive their operating power therefrom.

Referring still to FIG. 1B, in one embodiment, system on a shock assembly 38 includes a number of components such as a PCB 596 and actuator 99. In one embodiment, PCB 596 is an ECU including one or more components such as internal sensors 331, a power source 595, a microcontroller 73, and motor controller 74. In one embodiment, system on a shock assembly 38 includes a plurality of electronics coupled therewith to collect data, actuate mechanisms, and communicate with external devices through wired and wireless protocols. In general, the electronic devices can include Master ECU, other shock-electronic-assemblies, HMIs, IMUs, and other sensors.

In one embodiment, internal sensors 331 may be one or more sensor(s) to monitor and/or measure things such as temperature, voltage, current, resistance, noise (such as when a motor is actuated, fluid flow through a flow path, engine knocks, pings, etc.), positions of one or more components of vehicle 50 such as, system on a shock assembly 38 settings (such as preload, compression settings, rebound settings, lockout, or the like) ride height, pitch, yaw, roll, and the like. In one embodiment, the one or more sensor(s) could be forward looking terrain sensors, vibration sensors, bump sensors, impact event sensors, angular measurements sensors, and the like. Additional information about sensors, other sensor types, and their operations are provided in U.S. Pat. Nos. 8,838,335; 9,353,818; 9,682,604; 9,797,467; 10,036,443; 10,415,662; the content of which are incorporated by reference herein, in their entirety.

Figure 2A:
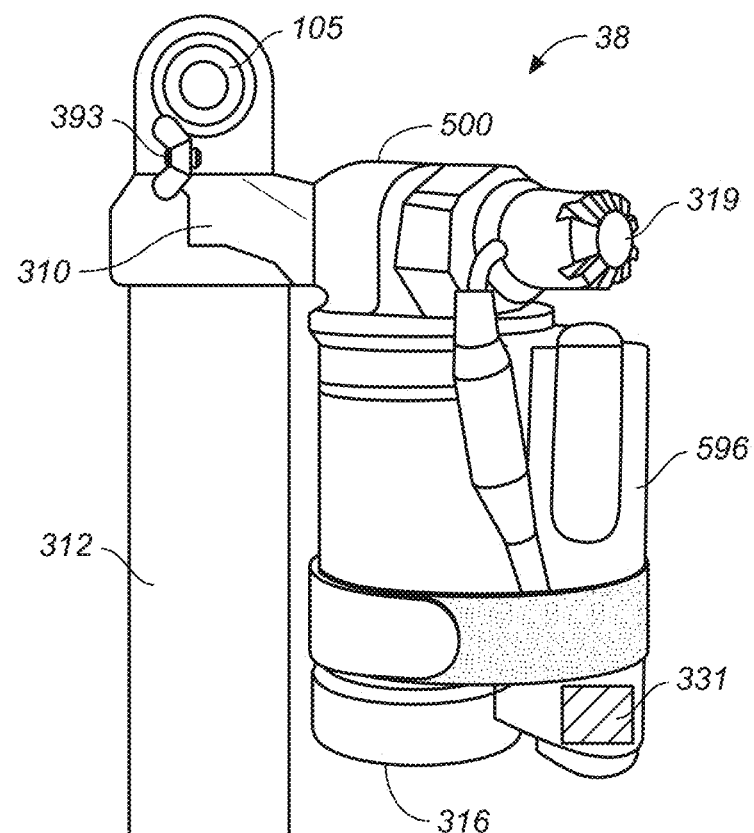
FIG. 2A is a perspective view of a system on a shock assembly, in accordance with an embodiment.
Figure 2A:
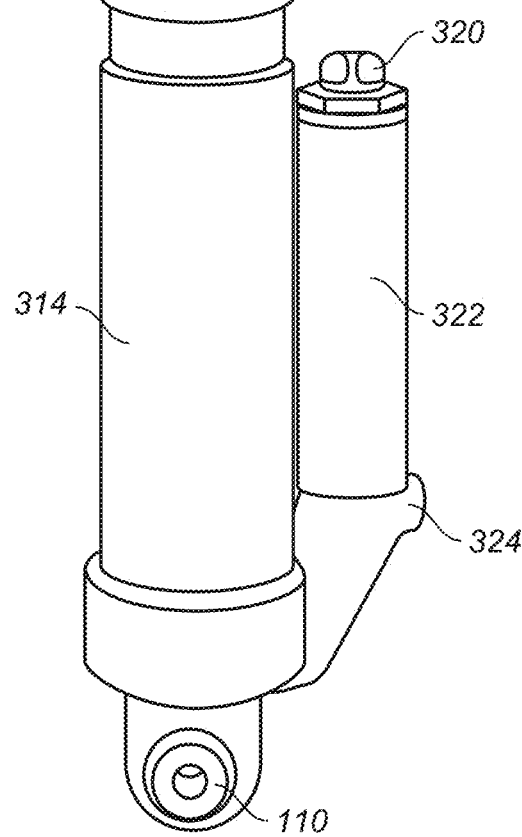

Referring now to FIG. 2A, a perspective view of system on a shock assembly 38 is shown in accordance with an embodiment. In one embodiment, the system on a shock assembly 38 is a FOX load optimizing air technology (FLOAT) air shock assembly with a reservoir 316. In general, the air shock assembly is a high-performance shock assembly that use air as springs, instead of heavy steel coil springs or expensive titanium coil springs.

In general, system on a shock assembly 38 includes attachment features such as, in one embodiment, a chassis mount (e.g., upper eyelet 105) and a rear suspension mount (e.g., lower eyelet 110) which allow system on a shock assembly 38 to be coupled between the sprung and unsprung portion of vehicle 50.

In one embodiment, system on a shock assembly 38 includes body 312, an expansion component (e.g., main air chamber 314) providing some type of expansive (or spring) force on system on a shock assembly 38, and a main air valve 324 for adding or removing air from main air chamber 314. In one embodiment, the system on a shock assembly 38 also includes body cap 310, and a reservoir 316 fluidly coupled with the body 312.

In one embodiment, system on a shock assembly 38 includes one or more electronically adjustable valves such as an electronically adjustable rebound damping valve 393, an electronic valve 500, and the like. In one embodiment, system on a shock assembly 38 includes a main chamber within body 312 that holds the working fluid and a main damping piston. In one embodiment, system on a shock assembly 38 includes a body cap 310 with a flow path therein fluidly coupling the main chamber within body 312 with a reservoir chamber of reservoir 316. In one embodiment, the electronic valve 500 is used to modify and/or control the flow rate of the working fluid through the flow path.

In general, the internal chamber of body 312 is filled with a working fluid (e.g., high viscosity index shock oil, etc.). In one embodiment, system on a shock assembly 38 includes an expansion component (e.g., main air chamber 314) used to provide some type of expansive (or spring) force to system on a shock assembly 38, a main air valve 324 for adding or removing air from main air chamber 314, and a piston coupled with a piston shaft, where the piston is located somewhere within the internal chamber of body 312. In one embodiment, when installed, the resting length of system on a shock assembly 38 is maintained in compression by the weight of the body it is suspending (e.g., the sprung portion of vehicle 50), and in expansion by the "spring" force produced by the expansion component (e.g., the main air chamber 314).

In one embodiment, reservoir 316 is fluidly coupled with the body 312 via a flow path(s) through body cap 310. In one embodiment, the reservoir 316 has a reservoir chamber that is divided by an internal floating piston (IFP). In one embodiment, one side of the IFP divided reservoir chamber is filled with a pressurized gas (e.g., nitrogen, or the like) and the other side of reservoir chamber is fluidly coupled with the main chamber of body 312 via flow path 404 and contains working fluid. In general, the IFP keeps the pressurized gas from mixing with the working fluid and/or reaching the flow path.

In operation, when the vehicle encounters a bump, system on a shock assembly 38 is compressed causing the piston and piston shaft to move further into the main chamber of body 312 (e.g., the compression stroke). After the compression stroke, the expansion component (e.g., main air chamber 314) which was compressed by body 312 moving thereinto, acts to push body 312 back out of the main air chamber 314, causing the piston and piston shaft to move back toward their original location within the chamber of body 312 (e.g., the rebound stroke).

During the compression stroke, some of the working fluid in the chamber of body 312 is displaced (due to the reduced volume within the chamber of body 312 caused by the incursion of the piston shaft). This displaced working fluid will flow from the chamber of body 312 through the flow path in the body cap 310 to the reservoir chamber. As the working fluid fills the reservoir chamber, it will cause the IFP to move further into reservoir chamber causing the pressurized gas to be further compressed, and in so doing, ensure consistent, fade-free damping in most riding conditions.

In one embodiment, system on a shock assembly 38 includes an optional extra volume (Evol) chamber 322 with an Evol air valve 320 (similar in function to main air valve 324 described herein). In one embodiment, the Evol chamber 322 allows the available air volume of main air chamber 314 of system on a shock assembly 38 to be changed on the fly, e.g., while the vehicle is in operation.

In one embodiment, the change in available air volume is controlled by a user providing an input electronically over a wired or wireless connection with user interface 205. In one embodiment, the change is automatically provided by an input from a control system on or connected with the vehicle such as VDM 21. In one embodiment, the change is automatically provided by an input from microcontroller 73 located on PCB 596. In one embodiment, the change to the air volume can be controlled by an automated system (e.g., microcontroller 73, VDM 21, or the like), while also receiving control inputs from the user via user interface 205.

In one embodiment, by using a main air chamber 314 and the Evol chamber 322, the air spring style system on a shock assembly 38 is lightweight and progressive. The progressive aspect occurs during the increase in spring force and travel. For example, as the system on a shock assembly 38 is compressed in a compression stroke, the spring force increase is provided by the body 312 reducing the volume of the main air chamber 314 which compresses the air therein. As the system on a shock assembly 38 is further compressed (such as during the second half of the shock travel or wherever the tuned air shock assembly is set to begin using the Evol chamber), the Evol chamber can be used to add to the spring force increase being generated by the additional compression of the air in the main air chamber 314. Thus, as the system on a shock assembly 38 travels through its compression range, the spring force will build progressively, such that any harsh bottoming of the suspension is virtually eliminated thereby providing a "bottomless" feel.

Moreover, because the main air chamber 314 and Evol chamber 322 are separated, they can be independently tuned. However, since they also work together in the described progressive fashion, the range of the combined tuning is greater than that of either alone. Thereby providing adjustability for performance across a wide variety of terrain, riding style, and user weights.

In general, adjusting the pressure in the main air chamber 314 is similar to changing a tender, and/or secondary springs, and/or the crossover spacers on a coil-over shock. Thus, adjusting the pressure in the main air chamber 314 will adjust ride height. In contrast, adjusting the pressure in the Evol chamber 322 is similar to changing a main spring on a coil-over shock, that is, it will help control bottom out and chassis roll.

Although the system on a shock assembly 38 shown is an air shock style shock assembly. In another embodiment, the system on a shock assembly 38 may also be a coil-over shock assembly, such as, for example, a FOX 2.0 zero QS3-R shock assembly with a velocity-sensitive shimmed damping system, one or more coil-over springs, a spring preload adjuster, and a reservoir. In another embodiment, the system on a shock assembly 38 may be another type of shock assembly such as, but not limited to, a stand-alone fluid damper assembly, a coil sprung adjustable shock assembly, an air sprung fluid damper assembly, or the like.

Referring still to FIG. 2A, in one embodiment, system on a shock assembly 38 includes a transmitter/receiver 420 which receives data transmissions via communications network 5.

In one embodiment, system on a shock assembly 38 use a communication protocol such as, but not limited to, those disclosed in the communication protocol section herein. In one embodiment, system on a shock assembly 38 uses small and light electronic componentry with a focus on both the minimizing of power requirements resulting in a long battery life and the minimizing of the weight/rotational inertia of the actuator 99.

Figure 2B:
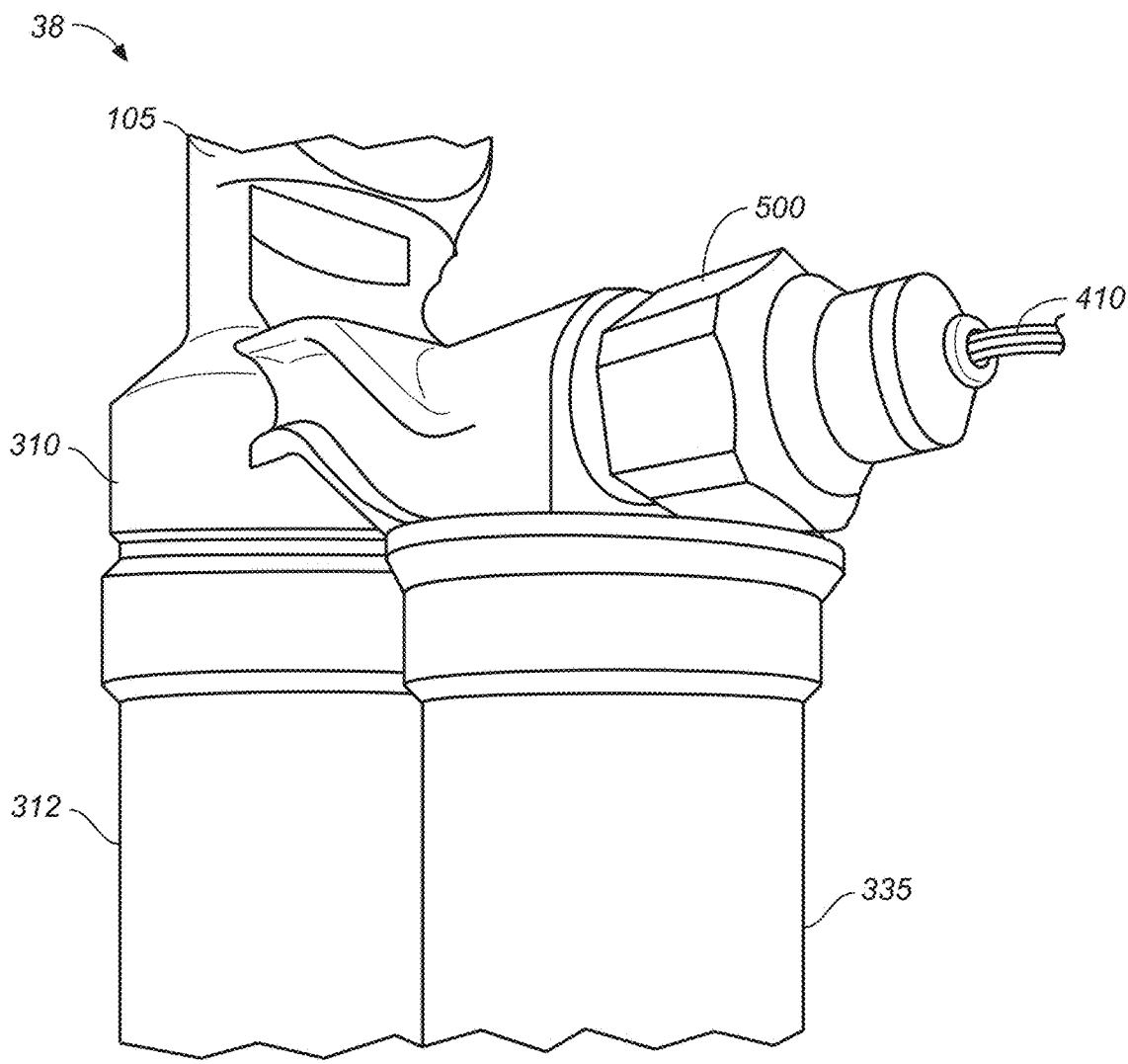
FIG. 2B is a perspective view of the system on a shock assembly with a wired configuration, in accordance with an embodiment.

With reference now to FIG. 2B, a perspective view of top portion of the system on a shock assembly 38 of FIG. 2A is shown in accordance with one embodiment. In one embodiment, system on a shock assembly 38 includes a wire 410 extending therefrom.

In one embodiment, the wire 410 provides the wired connection with communications network 5 (and one or more of the other components of plug and play suspension system 75).

Figure 2C:
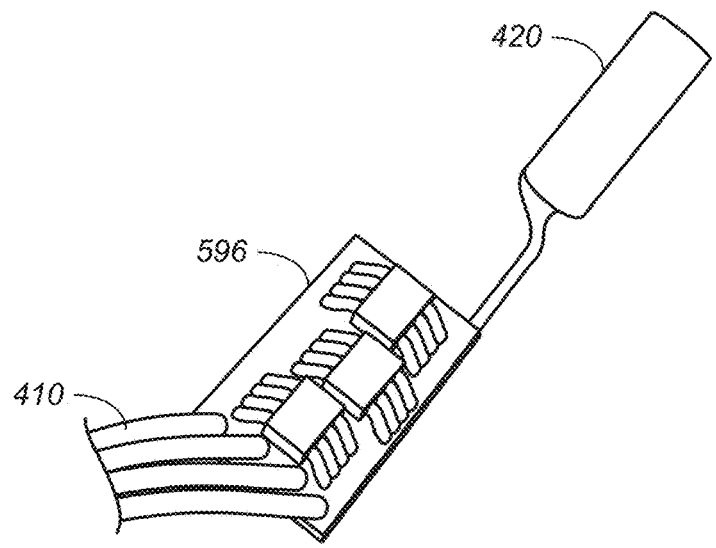
FIG. 2C is a perspective view of a wireless receiver and controller for a wireless configuration for the system on a shock assembly of FIG. 2B, in accordance with an embodiment.

In one embodiment, as shown in FIG. 2C, wire 410 of FIG. 2B is coupled with a transmitter/receiver 420 and PCB 596 (which in one embodiment includes power source 595, microcontroller 73, motor controller 74, sensor 331) in accordance with an embodiment.

Although components of FIGS. 2A-2C are shown in given locations in accordance with one embodiment, in other embodiments, one, some, or all of the components shown in FIGS. 2A-2C are could be located in other locations, one or more components could be separated into two or more pieces and dispersed, etc. Thus, the use of the locations of the components as shown in FIGS. 2A-2C are indicative of one embodiment, which is provided for purposes of clarity.

Figure 3:
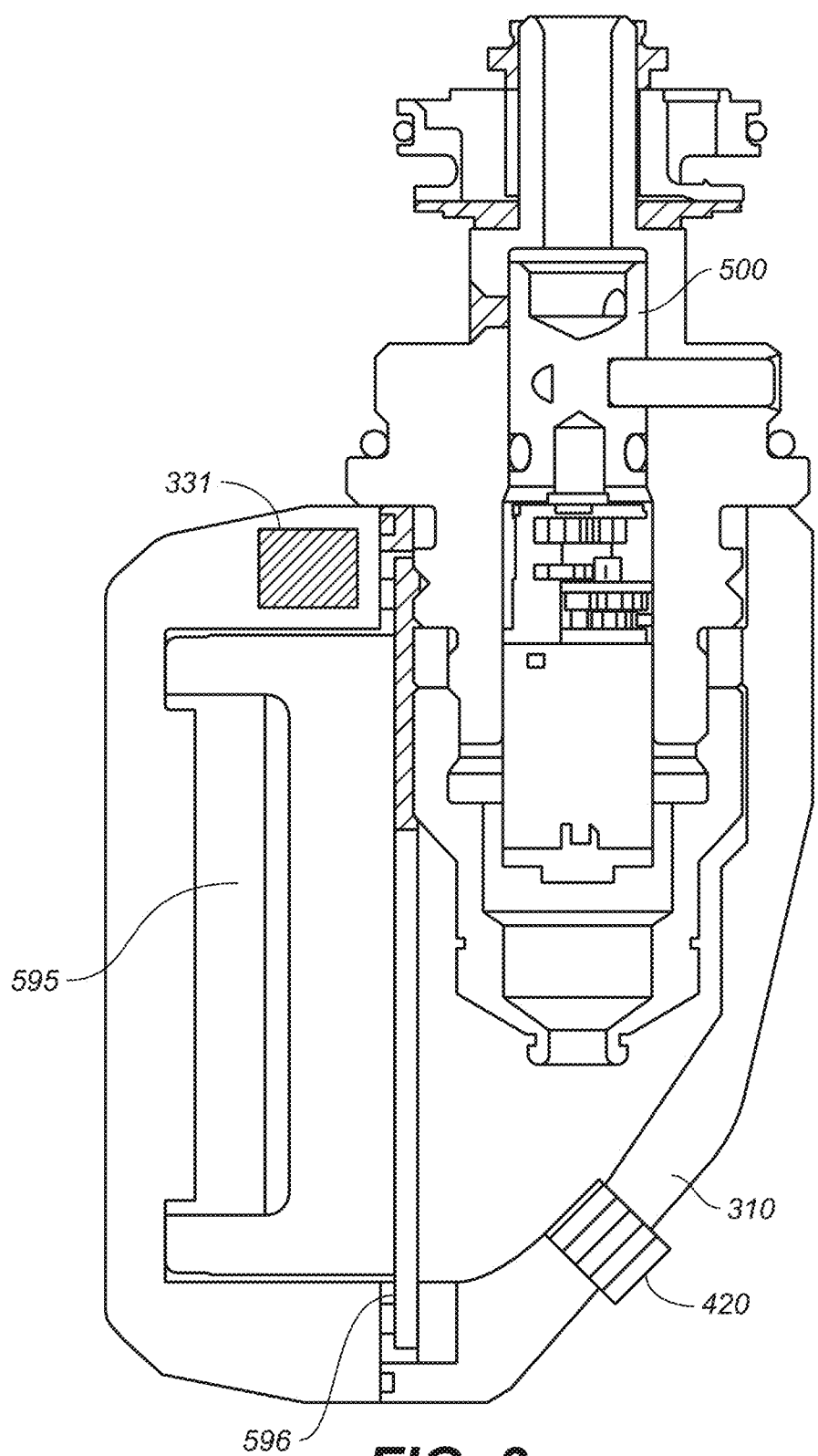
FIG. 3 is a cut-away view of a portion of the system on a shock assembly including the PCB, in accordance with an embodiment.

Referring now to FIG. 3, a cut-away view of a portion of system on a shock assembly 38 with electronic valve 500, a power source 595, a PCB 596 (which in one embodiment includes microcontroller 73, motor controller 74, sensor 331), and transmitter/receiver 420 are shown in accordance with an embodiment.

In one embodiment, the control process utilizes the wireless radio (at the user interface 205), a microcontroller 73 and a motor controller 74 (in one embodiment, both the microcontroller and the motor controller are located closer (if not physically coupled with) actuator 99). In one embodiment, microcontroller and motor controller are located on the same PCB 596. In one embodiment, the wireless radio senses an actuation signal from the trigger unit e.g., the user interacts with user interface 205 to indicate a desired change to the shock assembly tune. When the actuation signal is received from the user interface 205, the microcontroller 73 sends a signal to the motor controller 74. In one embodiment, the motor controller allows power from the power source (such as 595 or the like) to be applied to the actuator 99. In one embodiment, full voltage from the power source is supplied to the actuator 99. In one embodiment, full voltage from the power source is supplied such that the actuator 99 is spun as quickly as possible. In one embodiment, less than full voltage from the power source is supplied to the actuator 99. In one embodiment, one or more components of the control process (e.g., microcontroller, motor controller, or the like) then monitor for a condition that occurs during the operation of actuator 99 (e.g., current, proxy current, time, resistance, voltage, temperature, other sensors input, or the like) that satisfies a predetermined criteria. When the condition is met, the power to actuator 99 is removed.

For example, in one embodiment, as power is provided to actuator 99, the motor controller 74 senses the current provided to actuator 99 using a circuit integrated into the motor controller 74. In general, the current (or other measurable aspect) varies over time (e.g., initially spiking to get the actuator 99 turning, then dropping while the electronic valve 500 moves, then spiking again when the electronic valve 500 hits a hard stop). In one embodiment, the operating current provided to actuator 99 is compared to one or more pre-determined values (or current thresholds) stored in the memory of the microcontroller 73. In one embodiment, when the sensed current meets the predetermined threshold (e.g., a current threshold that represents actuator 99 stall), the microcontroller 73 sends a signal to the motor controller 74 to shut off the power to the actuator 99. In one embodiment, this would complete a "closed" portion of the control strategy (e.g., closing the electronic valve 500) and lockout the system on a shock assembly 38.

In one embodiment, when the user selects a different suspension tune via user interface 205, the reverse operation occurs to open electronic valve 500. That is, the wireless radio receives the data. The microcontroller 73 sends a signal to the motor controller 74 to once again allow power to be provided to the actuator 99, (however, in one embodiment, it is provided in an opposite polarity from that provided in the electronic valve 500 close operation to cause the actuator 99 to rotate in the opposite direction). Once again, the current is sensed until the current threshold criteria is met, at which point the microcontroller 73 sends a signal to the motor controller 74 to shut off the power to actuator 99. In one embodiment, this would complete the "unlock" portion of the control strategy (e.g., opening the electronic valve 500).

In one embodiment, the use of the control process described herein to monitor and analyze the sensed current greatly reduces the complexity associated with the opening and closing of conventional electronically-actuated valves. For example, in one embodiment only two wires are required to be coupled to actuator 99. In general, the two wires provide the power to actuator 99, (e.g., completing a circuit between the power source 595 and actuator 99). In one embodiment, the microcontroller 73 and/or motor controller 74 would also be included in the circuit to control the flow of power from the power source 595 to actuator 99.

In one embodiment, the current (or other measurable aspect) can be sensed at any desired location of the circuit. For example, in various embodiments, the current may be sensed at, but not limited to, any of the following locations, at or very near actuator 99, at a location remote from actuator 99, at the same location as the power source 595, at a control unit (such as microcontroller 73 and/or motor controller 74), and the like.

In one embodiment, instead of (or in addition to) the measuring and/or monitoring of a current threshold of the actuator 99 to determine electronic valve 500 has reached a stopping point, other measuring devices such as timers, filters, thermometer, other sensors, and the like, may be used to measure time, resistance, voltage, temperature, noise, or the like. Here again, the control process is looking for a condition (e.g., current, proxy current, time, resistance, voltage, temperature, other sensors input, or the like) supplied to the actuator 99 that satisfies a predetermined criteria.

For example, if the actuator 99 rotational rate for a given power is known, and the amount of desired rotation of the electronic valve 500 is also known, a timer or the like could be used to control the time the power is supplied to actuator 99. For example, if actuator 99 spins at a rate of 200 rpm and the electronic valve 500 needs to be rotated 180 degrees, then the timer would let the actuator 99 operate for 0.15 seconds. In one embodiment, the timer and/or filters disclosed herein could also be used as back-up or confirmation settings to ensure against faults/transients such as where the stall current threshold is reached before the electronic valve 500 is completely open or completely closed. Thus, using any and/or all of these methods, there is no need to measure the position of the actuator 99 directly.

As discussed above, in one embodiment, electronic valve 500 is (effectively) a two-state valve. In other words, the electronic valve 500 is either open or closed.

In one embodiment, the electronic valve 500 may have intermediate states (to limit flow, such as a high flow, a medium flow, a slow flow, etc., but not at zero flow). In one embodiment, there may be a control system (an encoder on actuator 99 with different settings thereon, etc.) to control/adjust the orifice size of electronic valve 500 into one or more intermediate states, (e.g., between on and off), to provide a regulated flow.

For example, electronic valve 500 could be a multi-state rotary spool valve having a number of intermediate states (to limit flow, such as a high flow, a medium flow, a slow flow, etc.) between the closed state and the full-open state. In one embodiment, the multi-state rotary spool electronic valve 500 would include one or more intermediate settings in addition to the softest and the lockout positions to control flow.

For example, multi-state rotary spool electronic valve 500 would have a firmness range that becomes increasingly firmer as the multi-state rotary spool is rotated from the soft setting to the lockout setting. In one embodiment, soft setting feature is on one end stop and lockout setting feature is on another end stop. In one embodiment, soft setting feature and lockout setting feature are set 150 degrees apart. In another embodiment, they may be set at a different range. The use of 150 degrees is one embodiment and provided for purposes of clarity in the following examples.

In general, during operation, the motor controller 74 may overshoot to each end stop to change between the soft setting and lockout setting of multi-state rotary spool electronic valve 500 using the control and operation description provided in the discussion of FIG. 3. In one embodiment, instead of (or in addition to) the measuring and/or monitoring of a current threshold of the actuator 99 to determine multi-state rotary spool electronic valve 500 has reached a stopping point, other measuring devices such as timers, filters, thermometer, other sensors, and the like, may be used to measure time, resistance, voltage, temperature, noise, or the like. Here again, the control process is looking for a condition (e.g., current, proxy current, time, resistance, voltage, temperature, other sensors input, or the like) supplied to the actuator 99 that satisfies a predetermined criteria.

In one embodiment, to obtain a middle firmness setting, a timer is used to time the operation of the actuator 99 such that it moves approximately half way between the soft setting and lockout setting. For example, if a rotational rate for a given power of actuator 99 is known, and the amount of desired rotation of the multi-state rotary spool electronic valve 500 is also known, a timer or the like could be used to control the time the power is supplied to actuator 99. For example, if actuator 99 spins at a rate of 200 rpm and the multi-state rotary spool electronic valve 500 needs to be rotated approximately 75 degrees, then the timer would let the actuator 99 operate for 0.06 seconds. Thus, using any and/or all of these methods, there is no need to measure the position of the actuator 99 directly to put the multi-state rotary spool electronic valve 500 in a softest position, a middle firmness position, or a firmest (or locked out) position.

In one embodiment, the microcontroller/Radio is a Feather M0 with RFM69HCW packet radio (433 MHz). In one embodiment, the motor controller is a DRV8833 2 channel controller with current limiting capabilities.

In one embodiment, the user interface 205 microcontroller/Radio is a Feather M0 with RFM69HCW packet radio (433 MHz). In one embodiment, user interface 205 includes a voltage regulator such as TSR-12450. In one embodiment, the buttons on user interface 205 are momentary switches.

Figure 4B:
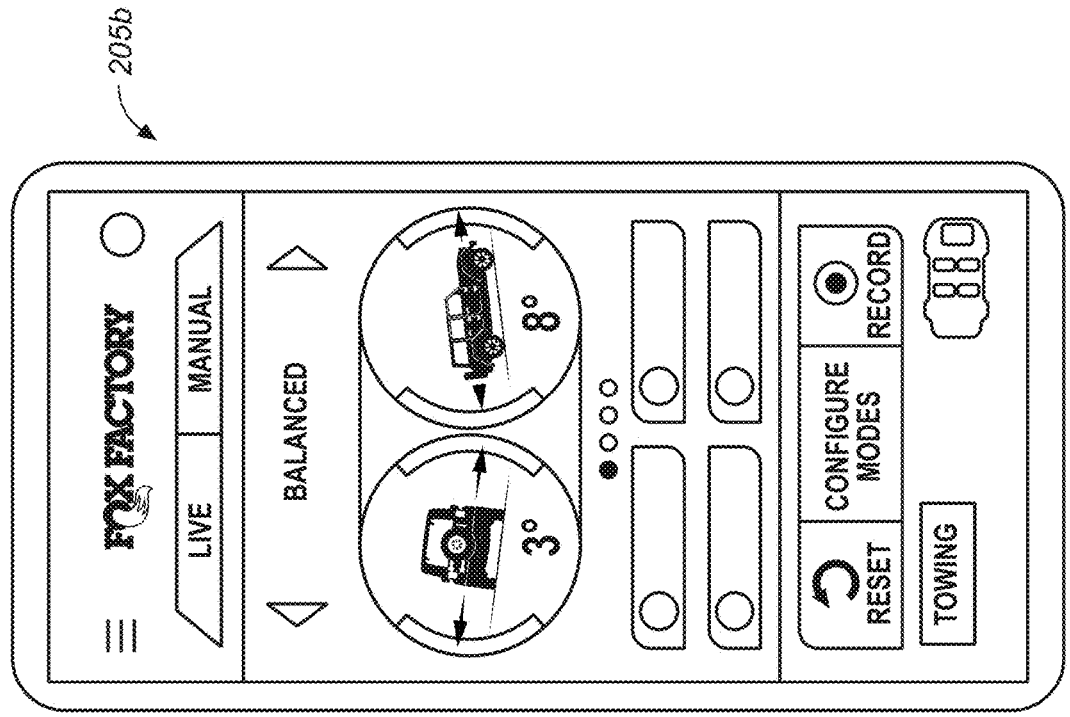
FIG. 4B is a perspective view of another type of user interface for the plug and play suspension, in accordance with an embodiment.
Figure 4A:
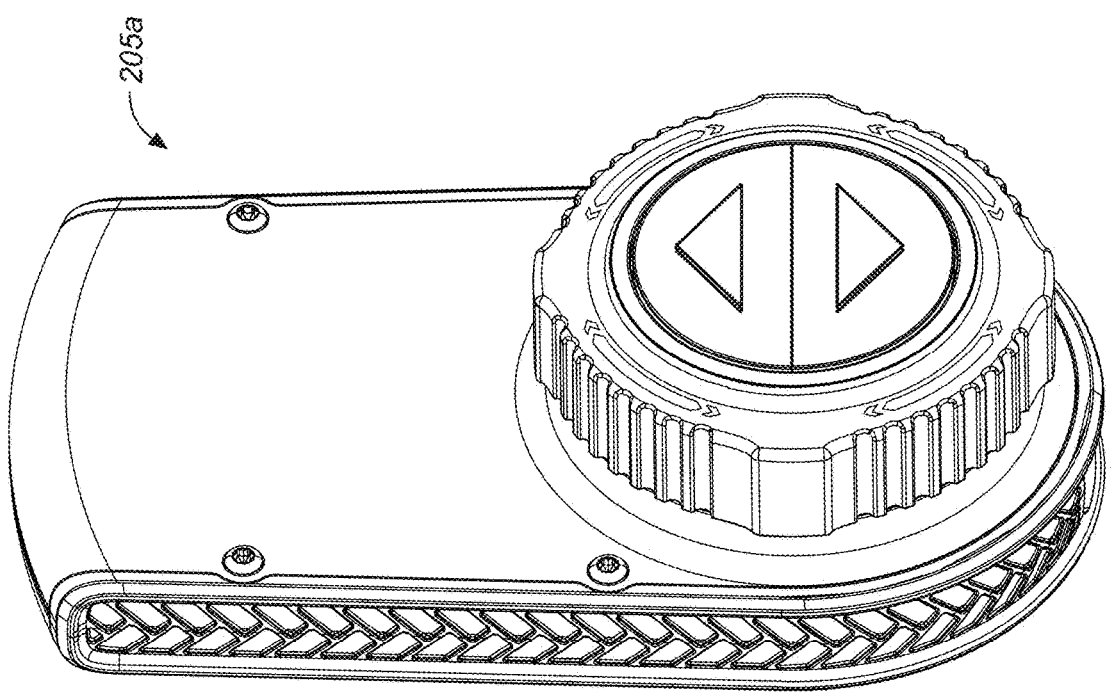
FIG. 4A is a perspective view of a user interface for the plug and play suspension, in accordance with an embodiment.
Figure 4C:
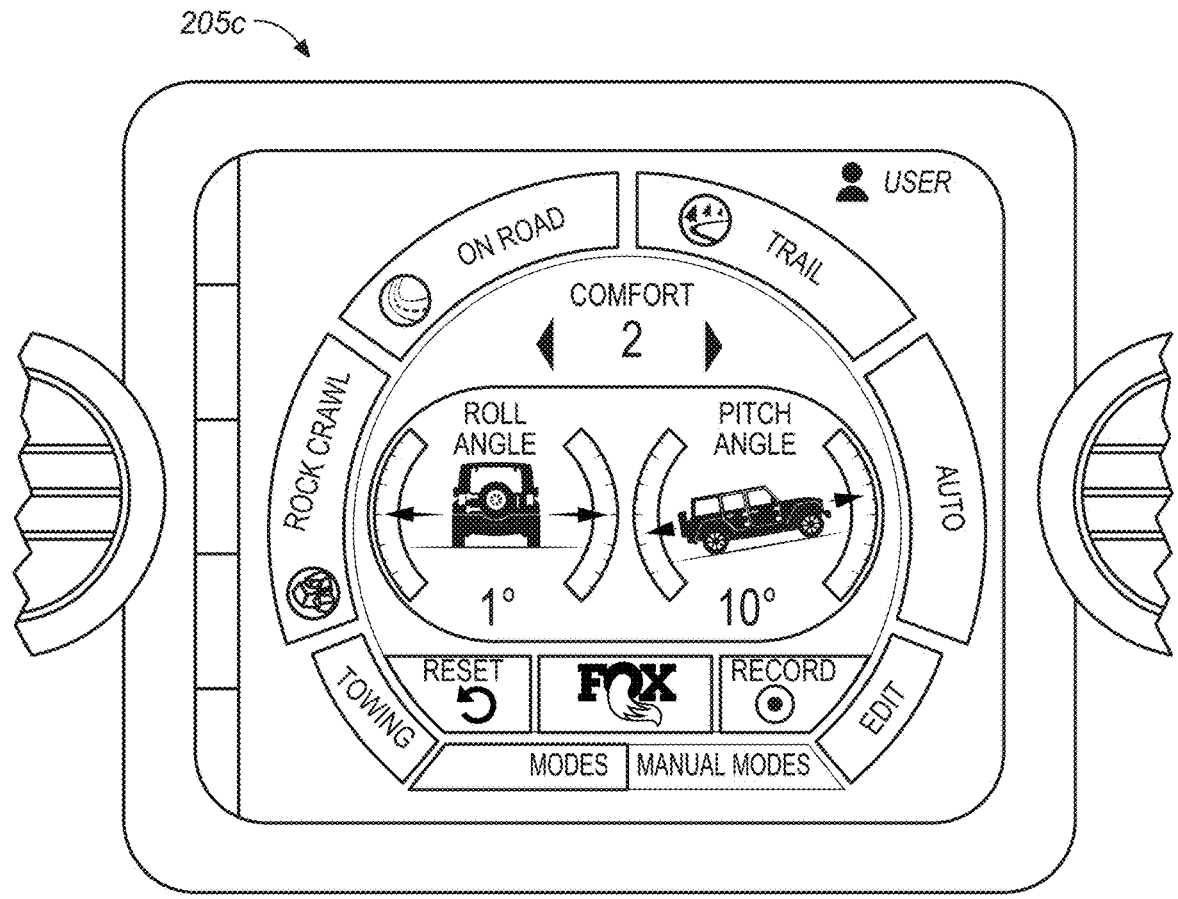
FIG. 4C is a perspective view of yet another type of user interface for the plug and play suspension, in accordance with an embodiment.
Figure 4D:
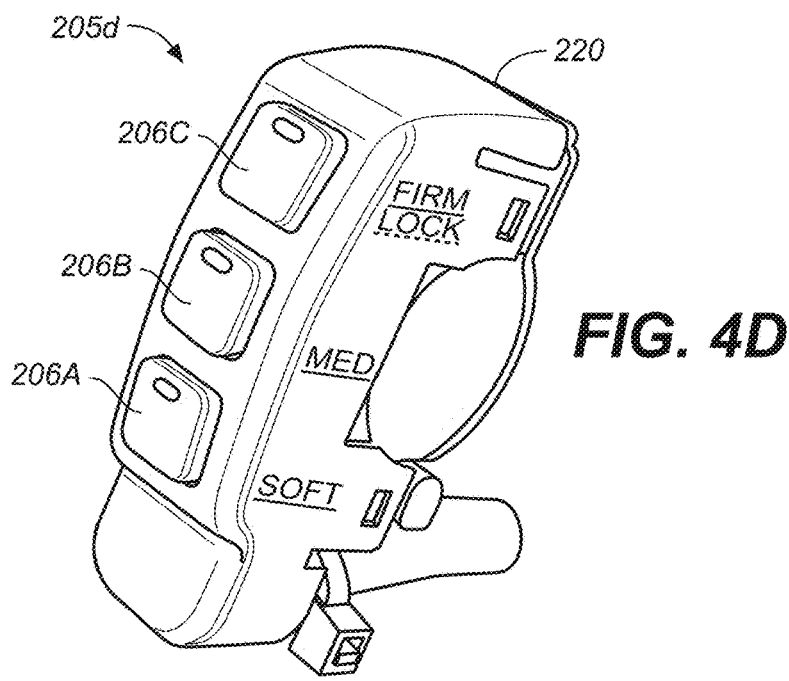
FIG. 4D is a perspective view of another type of user interface for the plug and play suspension, in accordance with an embodiment.

With reference now to FIGS. 4A-4D, a plurality of perspective views of different types of user interfaces 205 are shown in accordance with an embodiment. In one embodiment, as shown in FIG. 4A, the user interface 205 is a touchpoint interface 205a. In one embodiment, as shown in FIG. 4B, the user interface 205 is a mobile device 205b. In one embodiment, as shown in FIG. 4C, the user interface 205 is an IVI interface 205c. In one embodiment, as shown in FIG. 4D, the user interface 205 is a button/switch type interface 205d.

In general, user interface 205 is provided in a location convenient for user manipulation during vehicle operation. In one embodiment, user interface 205 is provided in the cockpit of vehicle 50 (or other part of vehicle 50 that is user accessible during vehicle operation). In one embodiment, button/switch type interface 205d is coupled with a vehicle component via a clip or other retaining device. In one embodiment, user interface may be part of an IVI interface 205c or mobile device 205b that is user interactive and may include features such as, but not limited to, voice activation/control, location derivation capabilities (e.g., a GPS device or the like), one or more applications operating thereon, a switch (or lever, button, etc.) or the like. Moreover, in different embodiments, the user interface 205 could be located at another portion of the vehicle, on a mount coupled with the vehicle, worn as a smart device, carried by the rider, or the like.

In one embodiment, the user interactive system will provide feedback, command, and/or control capabilities for one or more aspects such as shock performance, stiffness, preload, rebound adjustment, compression adjustment, and/or overall vehicle suspension configurations. In one embodiment, the control capabilities could be programmable, modifiable, and/or adjustable in real-time by a user input. In one embodiment, the user input adjustments could be based on aspects such as, but not limited to, pre-defined times, location(s), terrain type, weather, suspension performance data, shock assembly performance data, sensor data, information received from another source, information from other components coupled with the vehicle such as the vehicle can bus, cameras, sensors, monitors, and the like.

In one embodiment, the control capabilities could be automatically switched to a different tune, automatically modified, and/or automatically adjusted based on aspects such as, but not limited to, pre-defined times, location(s), distance traveled, terrain type, weather, suspension performance data, shock assembly performance data, sensor data, information received from another source, information from other components coupled with the vehicle such as the vehicle can bus, cameras, sensors, monitors, and the like.

In the following discussion, the operation of user interface 205 will be described in conjunction with user interface 205d of FIG. 4D. However, it should be appreciated that similar operation of and interaction between user interface 205 and the one or more system on a shock assemblies 38 of the plug and play suspension system 75 are available in different formats depending upon the different type of user interface 205.

In one embodiment, when the user interacts the user interface 205, a signal is sent from the user interface 205 to one or more system on a shock assemblies 38. In one embodiment, communications component 220 will provide wireless communications between the user interface 205 and the system on a shock assembly 38. In one embodiment, communications component 220 will provide a wired communication between the user interface 205 and the system on a shock assembly 38.

In one embodiment, user interface 205d includes a number of buttons 206A-206C. Although three buttons are shown, this is indicative of one embodiment and is shown for purposes of clarity.

In one embodiment, user interface 205 stores one or more programmable (or preset) shock assembly settings (or tunes) that, when selected, cause one or more characteristics of one or more system on a shock assemblies 38 to be changed on the fly. In one embodiment, such as shown in FIG. 4D, a different tune is selected by each of the three buttons, e.g., buttons 206A-206C.

In general, different tunes provide different performance characteristics for the system on a shock assembly 38. In one embodiment, the different tunes can make large, medium, and/or small changes to the characteristics of the system on a shock assembly 38. Thus, one tune might be a softest performance setting, while another tune is a lockout setting.

For example, in one embodiment, button 206A would be a soft mode, e.g., a tune designed for maximum comfort. In one embodiment, button 206B would provide another tune such as a middle mode (e.g., a tune designed for balanced all-around performance), a firm mode (e.g., a shock assembly tune designed for aggressive trail riding, increased load carrying capacity, etc.), or the like. In one embodiment, button 206C would cause the lockout to be engaged (or disengaged).

In another embodiment, user interface 205 may have any number of screen selectable options, buttons, switches, levers, dials, or the like, each of which could also have one or more tunes associated therewith.

In one embodiment, the user interface 205 may be integrated with the vehicle structure, suspension components, suspension component controller(s) and data processing system as described in U.S. Pat. Nos. 7,484,603; 8,838,335; 8,955,653; 9,303,712; 10,060,499; 10,443,671; 10,737,546; and 10,933,710 the content of each of which are incorporated by reference herein, in their entirety.

In one embodiment, when plug and play suspension system 75 includes a plurality of system on a shock assemblies 38, the adjustments provided by user interface 205 could be the same, or different for one or more of the different system on a shock assemblies 38. Moreover, it should be appreciated that if less than all four shock assemblies are system on a shock assemblies 38, the above example, would be similarly applied to the active shock assemblies of the system.

In one embodiment, a user (and/or manufacturer, after market provider, suspension tuner, mechanic, etc.) would be able to set up the same or different configurations for one or more of the system on a shock assemblies 38 for each tune. The differences could be due to user skill, terrain type, ride format (e.g., work, fun, race, thrill, extreme, etc.), loaded weight, altitude, temperature, etc.

In one embodiment, the different tunes can be predefined for a given vehicle to cover different performance characteristics such as, but not limited to, smooth ride, fast ride, bumpy ride, hill climb, hill descent, and the like. In one embodiment, the different tunes may be modified by the user for more personalized performance based on aspects such as, but not limited to user skill, user body type, the vehicle, components on the vehicle, other suspension settings on the vehicle, location of operation, terrain type, weather, temperature, etc. In one embodiment, the tunes may be downloaded from a user's computer, mobile device, etc. In one embodiment, the tunes may be obtained via a suspension tune application, library, or the like as described in U.S. Pat. No. 11,459,050, which is incorporated herein by reference in its entirety.

Power Source

In one embodiment, one power source could be used to power a plurality of components of plug and play suspension system 75. For example, power source 78 may be used as a power source for one, some, or all of the plug and play suspension system 75 components.

In one embodiment, one power source could be used to power some of the plurality of components of plug and play suspension system 75, while other of the components of plug and play suspension system 75 would have their own power source 595. For example, power source 78 may be used as a power source for a plurality of components such as any combination of one or more of the user interface 205, system on a shock assemblies 38, one or more sensor(s) 331, smart components, and the like. While the remaining one or more of the user interface 205, system on a shock assemblies 38, one or more sensor(s) 331, smart components, and the like would each have their own power source.

In one embodiment, each of the user interface 205, system on a shock assemblies 38, one or more sensor(s) 331, smart components, and the like, would have its own power source.

In one embodiment, there may be a plurality of power sources shared by any combination of one or more of the user interface 205, system on a shock assemblies 38, one or more sensor(s) 331, smart components, and the like. For example, in one embodiment, user interface 205 and at least one system on a shock assembly 38 would share a power source.

In one embodiment, the power source is integrated with a component, and as such, is not easily or readily removable without some amount of disassembly. For example, the power source may be integrated into user interface 205, system on a shock assemblies 38, one or more sensor(s) 331, smart components, and the like. As such, the power source would either have to be replaced during a disassembly procedure, be designed to last for a given amount of time, be wired or wirelessly rechargeable in place, or the like. For example, in one embodiment, the component might have a charging port that allows a charger to connect with the power source integrated therein.

In one embodiment, the power source is removably coupled with one or more components such that it can be removed, replaced, or the like. For example, the power source would be located in an accessible location, such as inside a protective cover or in a housing such as on one or more of the user interface 205, system on a shock assemblies 38, one or more sensor(s) 331, smart components, and the like. In one embodiment, by being removably coupled with one or more components, the power source can be removed by a user for replacement, storage, charging, security (e.g., so it is not stolen), and the like.

In one embodiment, one or more power sources may be externally mounted on the frame and/or one or more other components of the vehicle. In one embodiment, the power source could be externally mounted such that it is easily and/or quickly removable for charging, replacement, storage, and/or security. In one embodiment, the power source could be externally mounted such that it is not easily and/or quickly removable for charging, replacement, storage, and/or security.

In one embodiment, one or more power sources may be internally mounted on the frame and/or one or more other components of the vehicle. In one embodiment, the power source could be internally mounted such that it is easily and/or quickly removable for charging, replacement, storage, and/or security. In one embodiment, the power source could be internally mounted such that it is not easily and/or quickly removable for charging, replacement, storage, and/or security.

In one embodiment, the power source could be a power source that is not dedicated to any of the components discussed herein. For example, if power source 78 is the main battery (or a power source for a light, for controlling a suspension state (e.g., raising or lowering the starting point of a front shock, raising or lowering the starting point of a rear shock), for a vehicle display (such as an IVI), for an electronic transmission, starter, seat warmer, etc.) it would have a primary functionality of providing power to the vehicle (or other component). As such, it may not be considered a dedicated battery for any other components. However, in one embodiment, the main battery may be used as a power source for one, some, or all of the user interface 205, system on a shock assemblies 38, one or more sensor(s) 331, smart components, and the like.

In one embodiment, the power source is comprised of a power station or power pack. In one embodiment, the power source is a non-rechargeable battery such as, but not limited to, one or more of a CR2032 battery, a double A battery, a triple A battery, a lithium coin cell battery, a silver oxide cell battery, or the like.

In one embodiment, the power source is a rechargeable battery such as, but not limited to, a lithium-ion battery. In one embodiment, the power source can be recharged wired or wirelessly. For example, a power source having a wirelessly rechargeable capability means it could be charged using a wireless power transfer system. E.g., using an inductive charger (or the like) within a given distance of the wirelessly rechargeable capability of the power source. Wireless charging, in its most basic form utilizes a copper coil to create an oscillating magnetic field, which can create a current in one or more receiver antennas. In general, the wireless charger could be a charging pad that use tightly-coupled electromagnetic inductive or non-radiative charging; A charging bowl or through-surface type charger that uses loosely-coupled or radiative electromagnetic resonant charging to transmit a charge a few inches; An uncoupled radio frequency wireless charger that allows a trickle charging capability at distances of many feet, or the like.

Examples of a wireless power transfer systems that could be used in one or more embodiments include those defined by the wireless power consortium (WPC) Qi standard, the AirFuel Alliance (e.g., Duracell Powermat, PowerKiss, etc.), WiTricity, Cota™ real wireless power, and the like.

In one embodiment, by using wireless power transfer, the power source can be charged even though if it is sealed within a component. In one embodiment, the power source can be charged while the component is installed on the vehicle 50. In one embodiment, the wireless power transfer capability is dependent upon factors such as, material type (e.g., composite, metal, thin, thick, etc.), the type of wireless power transfer being used, etc.

In one embodiment, the power source is an energy harvesting switch that does not require a battery or other powered connection. As such, the energy harvesting switch is capable of operating for an indefinite amount of time without requiring any type of recharge, battery change, etc. For example, in one embodiment, the energy harvesting switch utilizes a momentary generator such as ZF electronics AFIG-0007 to provide power.

In one embodiment, the power source is a combination or hybridization of two or more of the replaceable battery, the rechargeable battery, the energy harvesting switch, and the like.

In one embodiment, and as a significant advantage over conventional approaches, the various power source location and/or configuration embodiments described herein eliminate the need for a user/rider to keep track of, or otherwise monitor, the power level of the power source at the component being powered. Instead, the user/rider is able to remove and "plug in" the power source, for example, after use of the vehicle and the power source will be fully recharged. Upon recharging, the power source is replaced on the vehicle, and the rider/user is assured that ample power will be provided to the component (or components being powered), E.g., user interface 205, system on a shock assemblies 38, one or more sensor(s) 331, smart components, and the like.

Communications Protocol

In one embodiment, one, some, or all of the user interface 205, system on a shock assemblies 38, one or more sensor(s) 331, smart components, and the like have wired and/or wireless communication capabilities.

In one embodiment, the wireless communications network 5 is selected from one or more of: a wireless personal area network (WPAN), a low power network (LPAN), Internet of things (IoT) connectivity, or the like. In one embodiment, the wireless communication protocol could be, but is not limited to, Bluetooth, WiFi, Bluetooth Low Energy (BLE), near field communication (NFC), UHF radio signal, Worldwide Interoperability for Microwave Access (WiMax), long-term evolution (LTE), industrial, scientific, and medical (ISM) band, IEEE 802.15.4 standard communicators, Zigbee, ANT, ISA100.11a (wireless systems for industrial automation: process control and related applications) wireless highway addressable remote transducer protocol (HART), MiWi, IPv6 over low-power wireless personal area networks (6LoWPAN), thread network protocol, subnetwork access protocol (SNAP), and the like.

Wireless Mesh Communications Network

In one embodiment, one, some, or all of the user interface 205, system on a shock assemblies 38, one or more sensor(s) 331, smart components, and the like, could form a wireless mesh communications network 5, such as a vehicle area network (VAN) or the like. In one embodiment, one or more components of the VAN could interact with the user/rider in any number of ways such as via touch, sound, vision, radio, wearable, and the like.

In one embodiment, the components within the communications network 5 may include an auxiliary or propriety private network encryption such as AES 128. In one embodiment, the AES-128 block cipher is operated in the Authenticated Encryption with Associated Data (AEAD) scheme, which allows encrypting the given plaintext, and authenticating associated plain text data. The AEAD scheme requires a 13-byte nonce value, referred to herein as AEAD-Nonce. When the AES-128 symmetric key, and AEAD-Nonce are unique for every packet, the connection is secured.

In one embodiment, the AEADNonce is constructed by concatenating the nonce of each device with the sequence number of the particular packet, for a total of 12 bytes, with the 13th byte padded with 00. This ensures the AEADNonce is unique, and the connection is therefore secure.

In one embodiment, one or more components within the communications network 5 may include communication protocols for one or more peers, such as an out-of-VAN wireless device that doesn't want to share its network. In this case, the out-of-VAN wireless device can provide a hardware interface and it can be piped into the VAN. Thus, in one embodiment, the communications network 5 can be used to connect and/or control almost any wireless aspect, as the network, topology, and features thereof are well suited to interacting with basic device operating structures.

In one embodiment, information broadcast from a given component will include a unique identifier (ID) that identifies the specific component that made the broadcast. Thus, even when a number of different components are operating in the same environment, plug and play suspension system 75 will be able to identify which component sent the signal based on the unique ID. In one embodiment, the unique ID is used during the programming/pairing of the components with communications network 5 and other components of plug and play suspension system 75.

In one embodiment, the unique ID is used to validate the sending component. Although a unique ID is used in one embodiment, in another embodiment, a different identification methodology may be used to identify the different components in the network. In one embodiment, the wireless network is an intra-vehicle wireless network (such as a VAN) for data transmission between at least two components coupled with the vehicle, the at least two components including, but not limited to, the user interface 205, system on a shock assemblies 38, one or more sensor(s) 331, smart components, and the like, coupled with the vehicle. In one embodiment, the intra-vehicle wireless network is a wireless mesh communications network 5. In one embodiment, the intra-vehicle wireless network includes an intra-vehicle transmission authentication and encryption protocol.

In one embodiment, the broadcast information or data (e.g., message payload) will include additional information/data comprising the wireless network which is passed to and from peripheral devices in the network. Thus, in one embodiment, the communications network 5 will allow for information/data to be exchanged between an off-vehicle device such as located on adjacent vehicles, other vehicle networks, etc.

In one embodiment, the communications network 5 includes an inter-vehicle communication (IVC) wireless network for data transmission between the vehicle and at least another vehicle, between the vehicle and a mobile communications device distinct from the vehicle, between the vehicle and an infrastructure component (such as a traffic light, beacon on a stop sign, road mile marker, a benchmark, or the like). In one embodiment, the IVC wireless network is a wireless mesh network. In one embodiment, the IVC wireless network includes an IVC transmission authentication and encryption protocol.

The IVC transmission authentication and encryption protocol can be distinct and different from the intra-vehicle transmission authentication and encryption protocol, such that a device receiving a communication can determine the origin of the communication. Often, the origin of the communication is important depending upon the data provided in the communication. For example, a transmission that includes sensor provided information might only be verified and acted upon if it includes the intra-vehicle transmission authentication and encryption protocol (such as for security purposes or the like).

In one embodiment, the IVC transmission authentication and encryption protocol can include levels of trust. For example, a vehicle used by a friend may have a "trusted" IVC transmission authentication and encryption protocol that allows a sensor from the friend's vehicle to provide information to a component on the user's machine, information that is verified and acted upon as sensor data from a "trusted" peripheral. In contrast, when an IVC transmission includes sensor provided information but it does not have a "trusted" IVC transmission authentication and encryption protocol it would not be verified and acted upon. However, other information such as stop sign warnings, terrain changing information, or the like from IVC transmissions would be evaluated by one or more components of the user's machine and may be used depending upon context, or the like.

In one embodiment, communication protocol is designed for low latency and long battery life. In one embodiment, the network implements the proprietary low-latency low-power radio protocol to provide an effective transport for communication between one or more components of plug and play suspension system 75.

In one embodiment, the wireless signal is a "telegram" or the like that includes the unique identifier (ID) that identifies the component that broadcast the telegram signal. Thus, even when several devices are operating in the same environment, the telegram signal will identify which component sent the signal. Although the unique ID is used in one embodiment, in another embodiment, a different portion of the telegram signal is used to identify the transmitting device.

In one embodiment, one or more components will periodically send a heartbeat (e.g., check-in message), to inform one or more of the other components that they are still active. In one embodiment, the heartbeat is sent at a 1 Hz communication rate. In one embodiment, the component that received, but did not send, the heartbeat will provide a response message to confirm that there is a wireless connection therebetween.

In one embodiment, a timer is used to count down a check-in or heartbeat time period. In one embodiment, the time period measured by the timer is preset by the manufacturer. In one embodiment, the time period measured by the timer is adjustably set by the manufacturer, by the user, by a mechanic, based on the vehicle location, terrain type, or the like.

In one embodiment, when the timer expires, the heartbeat is sent. In one embodiment, once the wireless communication is confirmed, the timer will be restarted.

In one embodiment, if there is no response to the heartbeat with a predefined period of time, another heartbeat will be sent. In one embodiment, if there is still no response received, an additional pre-defined number of heartbeat signals will be sent.

In one embodiment, one or more of the components can be in a number of different energy states to conserve battery life. Although a number of states are discussed, in one embodiment there may be more, fewer, or a different combination or variation of the described energy states. The use of the disclosed energy states is provided herein as one embodiment and for purposes of clarity.

One state is referred to as the operating state. This is the highest battery power consumption state. In the operating state, the component is transmitting and/or receiving data.

In a standby state, the component is awake and there is a connection therebetween. For example, in the standby state, the user interface 205 is waiting to receive input from the user. When the user provides an input, user interface 205 will move into the operating state and transmit the data to system on a shock assemblies 38.

In one embodiment, when system on a shock assemblies 38 responds to the transmission from user interface 205, it will be known to both devices that there is a connection therebetween, that the signal has been received by system on a shock assembly 38, and that one or both the system on a shock assembly 38 and/or the user interface 205 can return to the standby state until the next time the user provides an input to user interface 205.

In one embodiment, system on a shock assembly 38 may not provide a response to the transmission from user interface 205. In one embodiment, user interface 205 may not expect a response from system on a shock assembly 38 after user interface 205 sends the transmission.

In one embodiment, the system on a shock assembly 38 may only provide the heartbeat message to the user interface 205 at pre-defined intervals to evidence the connection between user interface 205 and system on a shock assembly 38.

In one embodiment, if user interface 205 expected but did not receive a response from system on a shock assembly 38, user interface 205 will include a programmed pre-defined number of attempts at transmitting the signal to system on a shock assembly 38 before making the determination that there is a disconnection in the communication between the user interface 205 and the system on a shock assembly 38.

In one embodiment, such as after a period of inaction, or the user interface 205 determines that the vehicle is not moving (e.g., based on a user input, a sensor input, or the like), such as for example, in one embodiment, a vibration sensor will determine that the vehicle is stationary, the user interface 205 will send a standby message to inform system on a shock assembly 38 and/or any active components of plug and play suspension system 75 that the vehicle is not moving. In one embodiment, the system on a shock assembly 38 and/or any active components of plug and play suspension system 75 will transition to a low-power mode or sleep mode when the standby message is received.

In one embodiment, once the user interface 205 is turned off (or otherwise not responding), system on a shock assembly 38 and/or any active components of plug and play suspension system 75 will enter a no-heartbeat standby state (e.g., an intermediate battery power consumption state), where system on a shock assembly 38 and/or any active components of plug and play suspension system 75 are awake and listening but are not sending any transmissions (e.g., heartbeat transmissions, etc.).

In one embodiment, system on a shock assembly 38 and/or any active components of plug and play suspension system 75 will remain in the no-heartbeat standby state until the connection with user interface 205 is re-established. In one embodiment, when system on a shock assembly 38 and/or any active components of plug and play suspension system 75 receive a message from user interface 205, it will know that the connection with user interface 205 is established (or re-established) and one or more of the system on a shock assembly 38 and/or any active components of plug and play suspension system 75 will transition from the no-heartbeat standby state to a heartbeat standby state.

In a dormant state, the vehicle is stationary. For instance, the vehicle is in storage or otherwise parked and is not moving. In one embodiment, when in the dormant state, active components such as the user interface 205, system on a shock assembly 38, components of plug and play suspension system 75, and/or any other active (or power consuming) components, will go into low-power mode. In one embodiment, while in the dormant state, system on a shock assembly 38 and/or any active components of plug and play suspension system 75 will periodically wake up to transmit a signal to user interface 205. If no response is received, system on a shock assembly 38, any active components of plug and play suspension system 75 will return to the dormant state, e.g., go back to sleep.

In contrast, if system on a shock assembly 38 and/or any active components of plug and play suspension system 75 receive a response from user interface 205 during the periodic wakeup, in one embodiment, system on a shock assembly 38 and/or any active components of plug and play suspension system 75 will change from the dormant state into the standby state.

In one embodiment, while in the dormant state, when motion is detected, the vibration sensor will wake the microcontroller on the user interface 205 (or in another embodiment, on the system on a shock assembly 38, on another active component, or the like) which will then transmit a wake-up signal to the other components. In one embodiment, the wake-up signal will be transmitted a number of times over a given time period (e.g., a time period longer than the periodic wakeup time period) to ensure the other components receive the wake-up transmission.

In one embodiment, while in the dormant state, when motion is detected, the vibration sensor will wake the microcontroller on a number of components such as user interface 205, system on a shock assembly 38, and/or another active component. In one embodiment, a user may interact with a component such as a button on user interface 205 (or turning a key to an on position, pushing a start button, operating the throttle, bouncing the suspension, or the like) which will cause the components to wake from the dormant state.

Thus, in one embodiment, the system on a shock assembly 38, and/or any active components of plug and play suspension system 75, and/or the user interface 205 can move between the different states fluidly using the model described above. In one embodiment, the system on a shock assembly 38, and/or any active components of plug and play suspension system 75, and/or the user interface 205 will try to remain in (or return to) the lowest powered state for the specific situation.

In one embodiment, the power draw for each state is approximated as an average of 150 microamp draw during the active state, an average of 32 microamp draw during either standby state, and an average of 1 microamp draw during the dormant state.

In one embodiment, for example when the power source is a battery such as a CR2032, the capacity is approximately 173 mAh. As such, and based on the power draw for each state, the expected battery life of the battery of the system on a shock assembly 38, and/or any active components of plug and play suspension system 75, and/or the user interface 205 is a number of months. In one embodiment, depending upon the duty cycle, the lifespan of the battery will be different.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A plug and play suspension system comprising:
   at least one electronically adjustable shock assembly;
   a controller; and
   a communications network to communicatively couple said controller with said at least one electronically adjustable shock assembly, wherein said at least one electronically adjustable shock assembly includes an active valve configured to automatically adjust its operation and corresponding damping characteristics of said at least one electronically adjustable shock assembly based upon operational information pertaining to a vehicle to which said at least one electronically adjustable shock assembly is coupled, wherein said active valve is configured to automatically adjust its operation and said corresponding damping characteristics of said at least one electronically adjustable shock assembly based upon operation of said vehicle and wherein said corresponding damping characteristics are dynamically adjusted to any setting during use of said vehicle.

2. The plug and play suspension system of claim 1, wherein said control provides an adjustment to at least one characteristic of said at least one electronically adjustable shock assembly, wherein said adjustment is an automatic input generated by said controller.

3. The plug and play suspension system of claim 2, wherein said adjustment is a manual input received by said controller.

4. The plug and play suspension system of claim 1, wherein said controller comprises: a user interface.

5. The plug and play suspension system of claim 4, wherein said user interface is an in vehicle infotainment (IVI) interface.

6. The plug and play suspension system of claim 4, wherein said user interface is a mobile device.

7. The plug and play suspension system of claim 1, wherein said controller is located remote from said at least one electronically adjustable shock assembly.

8. The plug and play suspension system of claim 1, wherein said communications network is selected from a group consisting of: a wired communications network, a wireless communications network, and a hybrid communications network comprising a combination of said wired communications network and said wireless communications network.

9. The plug and play suspension system of claim 1, wherein said communications network utilizes an encryption protocol.

10. The plug and play suspension system of claim 1, wherein said communications network is communicatively coupled with a component separate from said plug and play suspension system.

11. At least one system on a shock assembly comprising:
a damper chamber comprising a working fluid;
a main piston coupled with a shaft, said main piston dividing said damper chamber into a compression side and a rebound side;
a fluid flow path;
a PCB comprising:
a microcontroller; and a motor controller;
a motive component communicatively coupled with said motor controller; and
a control valve coupled with said motive component, wherein said motive component causes said control valve to modify a size of said fluid flow path to change a damping characteristic, wherein said control valve is an active valve configured to automatically adjust its operation and corresponding damping characteristics of said shock assembly based upon operational information pertaining to a vehicle to which said shock assembly is coupled, wherein said active valve is configured to automatically adjust its operation and said corresponding damping characteristics of said at least one electronically adjustable shock assembly based upon operation of said vehicle and wherein said corresponding damping characteristics are dynamically adjusted to any setting during use of said vehicle.

12. The at least one system on a shock assembly of claim 11, wherein said microcontroller provides a damping characteristic adjustment to said motive component.

13. The at least one system on a shock assembly of claim 11, wherein power for said at least one system on a shock assembly is received from an external power source.

14. The at least one system on a shock assembly of claim 11, further comprising:
a self-contained power source.

15. The at least one system on a shock assembly of claim 11, further comprising:
at least one sensor, said at least one sensor to provide sensor data to said microcontroller.

16. A plug and play suspension system comprising:
a plurality of system on a shock assemblies; and
a communications network to communicatively couple each of said plurality of said system on a shock assemblies, wherein said communications network is a stand-alone communications network, wherein at least one of said shock assemblies includes an active valve configured to automatically adjust its operation and corresponding damping characteristics of said at least one of said shock assemblies based upon operational information pertaining to a vehicle to which said at least one of said shock assemblies is coupled, wherein said active valve is configured to automatically adjust its operation and said corresponding damping characteristics of said at least one electronically adjustable shock assembly based upon operation of said vehicle and wherein said corresponding damping characteristics are dynamically adjusted to any setting during use of said vehicle.

17. The plug and play suspension system of claim 16, wherein each of said plurality of system on a shock assemblies comprise:
a damper chamber comprising a working fluid;
a main piston coupled with a shaft, said main piston dividing said damper chamber into a compression side and a rebound side;
a fluid flow path;
a PCB comprising:
a microcontroller; and a motor controller;
a motive component communicatively coupled with said motor controller; and
a control valve coupled with said motive component, wherein said motive component causes said control valve to modify a size of said fluid flow path to change a damping characteristic.

18. The plug and play suspension system of claim 16, wherein at least one of said plurality of system on a shock assemblies further comprise:
a self-contained power source.

19. The plug and play suspension system of claim 16, further comprising:
at least one sensor, said at least one sensor to:
generate sensor data; and
transmit said sensor data over said communications network to one or more of said plurality of system on a shock assemblies.

20. The plug and play suspension system of claim 16, wherein said communications network utilizes an encryption protocol; and said communications network is selected from a group consisting of: a wired communications network, a wireless communications network, and a hybrid communications network comprising a combination of said wired communications network and said wireless communications network.

21. The plug and play suspension system of claim 16, wherein said communications network comprises a spoke and hub network configuration.

22. The plug and play suspension system of claim 16, wherein said communications network comprises a node to node network configuration.

23. The plug and play suspension system of claim 16, further comprising:
a user interface, said user interface located remote from said plurality of said system on a shock assemblies, said user interface communicatively coupled with at least one of said plurality of said system on a shock assemblies, said user interface selected from a group consisting of: a vehicle infotainment (IVI) interface, a mobile device, and a switch.

24. The plug and play suspension system of claim 16, wherein at least one of said plurality of said system on a shock assemblies in communicatively coupled with a component separate from said plug and play suspension system.

25. The plug and play suspension system of claim 16, further comprising:
a new component added to said plug and play suspension system, wherein said new component automatically recognizes its function and role in the plug and play suspension system after it is communicatively coupled with said communications network.

* * * * *